United States Patent
Johnson et al.

(10) Patent No.: US 10,106,658 B2
(45) Date of Patent: Oct. 23, 2018

(54) SUBSTANTIALLY CROSSLINKED POLYCARBONATE ARTICLES

(71) Applicant: SABIC GLOBAL TECHNOLOGIES B.V., Bergen op Zoom (NL)

(72) Inventors: Peter Johnson, Mount Vernon, IN (US); Kwan Hongladarom, Mount Vernon, IN (US); Jean-Francois Morizur, Mount Vernon, IN (US); Paul Dean Sybert, Mount Vernon, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 56 days.

(21) Appl. No.: 15/319,915

(22) PCT Filed: Jun. 19, 2015

(86) PCT No.: PCT/IB2015/054645
§ 371 (c)(1),
(2) Date: Dec. 19, 2016

(87) PCT Pub. No.: WO2015/193861
PCT Pub. Date: Dec. 23, 2015

(65) Prior Publication Data
US 2017/0130011 A1    May 11, 2017

Related U.S. Application Data

(60) Provisional application No. 62/014,439, filed on Jun. 19, 2014, provisional application No. 62/014,797, filed on Jun. 20, 2014.

(51) Int. Cl.
| | | |
|---|---|---|
| *C08F 2/50* | (2006.01) | |
| *C08G 61/04* | (2006.01) | |
| *C08J 3/28* | (2006.01) | |
| *C08G 64/14* | (2006.01) | |
| *C08G 64/42* | (2006.01) | |
| *C08J 3/24* | (2006.01) | |

(52) U.S. Cl.
CPC ............... *C08J 3/28* (2013.01); *C08G 64/14* (2013.01); *C08G 64/42* (2013.01); *C08J 3/24* (2013.01); *C08J 2369/00* (2013.01)

(58) Field of Classification Search
CPC . C08J 3/28; C08J 2369/00; C08J 3/24; C08G 64/14; C08G 64/42
USPC .................................. 522/163, 162, 1; 520/1
See application file for complete search history.

(56) References Cited

U.S. PATENT DOCUMENTS

| | | | |
|---|---|---|---|
| 4,153,780 A | 5/1979 | Narita et al. | |
| 9,758,616 B2 * | 9/2017 | Morizur | C08G 64/24 |
| 2011/0223336 A1* | 9/2011 | Bloomquist | C08L 5/00 427/331 |
| 2014/0179817 A1* | 6/2014 | Morizur | C08G 64/045 521/180 |
| 2014/0179821 A1* | 6/2014 | Morizur | C08G 64/14 522/35 |
| 2014/0179891 A1* | 6/2014 | Hoover | C08G 64/14 528/126 |
| 2014/0272347 A1* | 9/2014 | Hongladarom | C08G 64/42 428/213 |
| 2014/0275314 A1* | 9/2014 | Morizur | C08L 77/00 522/35 |
| 2014/0275324 A1* | 9/2014 | Morizur | C08G 64/14 522/178 |
| 2017/0113407 A1* | 4/2017 | Cox | B33Y 70/00 |
| 2017/0166708 A1* | 6/2017 | Flores | C08J 3/24 |
| 2017/0166742 A1* | 6/2017 | Hoover | C08L 69/00 |
| 2017/0184971 A1* | 6/2017 | Johnson | G03F 7/2002 |
| 2017/0247507 A1* | 8/2017 | Hoover | C08G 64/14 |

FOREIGN PATENT DOCUMENTS

| | | | |
|---|---|---|---|
| EP | 0001577 | 5/1979 | |
| EP | 0001577 A1 * | 5/1979 | C08G 64/04 |
| WO | WO 2014100635 | 6/2014 | |
| WO | WO 2014100745 | 6/2014 | |
| WO | WO 2014144304 | 9/2014 | |

OTHER PUBLICATIONS

Freitag et al, EP 0001577 Machine Translation, May 2, 1979 (Year: 1979).*
International Search Report for PCT/IB2015054645 dated Nov. 27, 2015.

* cited by examiner

*Primary Examiner* — Jessica Whiteley
(74) *Attorney, Agent, or Firm* — Cantor Colburn LLP

(57) ABSTRACT

Polycarbonate articles having improved properties due to their substantially cross-linked nature are disclosed. The substantially cross-linked articles are formed by forming a product from a polymeric composition comprising a cross-linkable polycarbonate resin containing a photoactive group derived from a benzophenone, and exposing the formed product to an effective dosage of ultraviolet radiation to cause substantial cross-linking throughout the article. Such cross-linking can also be used to obtain films having good scratch resistance properties.

8 Claims, 6 Drawing Sheets

SUBSTANTIALLY CROSSLINKED POLYCARBONATE ARTICLES

CROSS-REFERENCE TO RELATED APPLICATIONS

This application is a 371 of PCT Application Serial No. PCT/IB2015/054645, filed Jun. 19, 2015, which claims priority to U.S. Provisional Patent Application Ser. No. 62/014,439, filed Jun. 19, 2014, and to U.S. Provisional Patent Application Ser. No. 62/014,797, filed Jun. 20, 2014, the entireties of which are fully incorporated by reference herein.

BACKGROUND

The present disclosure relates to polycarbonate articles (e.g. films, powders, fibers, etc.) that are substantially cross-linked generally throughout their thickness, and/or have good scratch resistance. The articles are formed from a cross-linkable polycarbonate resin containing a photoactive group derived from a benzophenone. Upon exposure to ultraviolet radiation, the photoactive group will crosslink with itself and/or with other polymeric base resins also present, improving overall chemical resistance, flame retardance, and other characteristics. Also included are processes for the formation of such articles and compositions containing the cross-linkable polycarbonate resins.

Polycarbonates (PC) are thermoplastic resins with desirable properties such as high impact strength and toughness, transparency, and heat resistance. However, they also drip when exposed to a flame, and this behavior worsens as wall thickness decreases. This is undesirable for applications requiring V0 or 5VA performance.

They can also be marred or degraded by common solvents, especially when their flow rate is increased by reducing the molecular weight of the polymer. Thin structures also typically have a high built-in strain. As the use temperature of such thin structures nears the glass transition temperature, the thin structure can lose its shape due to release of the strain. It would be desirable to produce articles which have thin walls, yet retain their shape and have improved flame retardance properties and improved chemical resistance.

Polycarbonates are also easy to scratch. One way to achieve better scratch resistance is to post-coat polycarbonate components with a coating that when cured provides the desired performance. The coating forms a bonded hard layer on the surface and has a thickness typically from 3 micrometers (μm) to 18 μm. Examples of such hard coats include acrylate hard coats that are either ultraviolet (UV) or thermally curable, silicone hard coats with acrylate primers, polyurethane hard coats, and melamine hard coats. However, an extra post-production coating step is required to apply and cure these coatings to the polycarbonate film surface. It would be desirable to eliminate this extra step.

BRIEF DESCRIPTION

The present disclosure relates to substantially cross-linked polycarbonate articles and processes for preparing these articles. Generally, the articles are thin, which permits ultraviolet light to penetrate the article and obtain substantial cross-linking. Also disclosed are articles with good scratch resistance.

Disclosed in various embodiments herein are substantially cross-linked articles, wherein the article is formed by: forming a product from a polymeric composition comprising: a cross-linkable polycarbonate resin containing a photoactive group derived from a benzophenone; and exposing the formed product to an effective dosage of ultraviolet radiation to cause substantial cross-linking of the polycarbonate resin throughout the formed product, producing the substantially cross-linked article.

The article may be a film, a fiber, a foam, a powder, or a molded article having at least one wall with a thickness of 0.6 millimeters (mm) or less. In particular embodiments, the article has a maximum thickness or diameter of 0.6 mm or less.

The benzophenone from which the photoactive group is derived may be a monohydroxybenzophenone. In such embodiments, the cross-linkable polycarbonate resin can be formed from a reaction comprising: the monohydroxybenzophenone; a diol chain extender; and a first linker moiety comprising a plurality of linking groups, wherein each linking group can react with the hydroxyl groups of the monohydroxybenzophenone and the diol chain extender. The cross-linkable polycarbonate resin may contain from about 0.5 mole % to about 5 mole % of endcap groups derived from the monohydroxybenzophenone.

In other embodiments, the benzophenone from which the photoactive group is derived may be a dihydroxybenzophenone. In such embodiments, the cross-linkable polycarbonate resin can be formed from a reaction comprising: the dihydroxybenzophenone; a diol chain extender; a first linker moiety comprising a plurality of linking groups, wherein each linking group can react with the hydroxyl groups of the dihydroxybenzophenone and the diol chain extender; and an endcapping agent. In specific embodiments, the dihydroxybenzophenone is 4,4'-dihydroxybenzophenone; the diol chain extender is bisphenol-A; and the first linker moiety is phosgene. The end-capping agent can be selected from the group consisting of phenol, p-t-butylphenol, p-cumylphenol, octylphenol, and p-cyanophenol. The cross-linkable polycarbonate resin may contain from about 0.5 mole % to about 50 mole % of endcap groups derived from the dihydroxybenzophenone.

The product may be exposed to from about 6 $J/cm^2$ to about 36 $J/cm^2$ of UVA radiation on opposite sides of the product. The product may be exposed to ultraviolet radiation having a wavelength between 280 nanometers (nm) and 380 nm. The substantially cross-linked article should have an insoluble fraction, or crosslinked fraction, or insoluble mass percentage, of at least 80%. The cross-linked article may have a water contact angle of 80° or less, including from about 70° to 80°.

Also disclosed herein are methods for producing a substantially cross-linked article, comprising: forming a product from a polymeric composition comprising: a cross-linkable polycarbonate resin containing a photoactive group derived from a benzophenone; and exposing the formed product to an effective dosage of ultraviolet radiation to cause substantial cross-linking of the polycarbonate resin throughout the formed product, producing the substantially cross-linked article.

The product may be exposed to from about 21 Joules per square centimeter ($J/cm^2$) to about 36 $J/cm^2$ of UVA radiation on opposite sides of the product. The product may be exposed to ultraviolet radiation having a wavelength between 280 nm and 380 nm. The substantially cross-linked article may have an insoluble fraction, or crosslinked fraction, of at least 80%, or at least 95%, or at least 97%. The formed product may have a maximum thickness of 0.6 mm or less.

In particular embodiments, the polymeric composition further comprises a foaming agent, and the formed product is a foam. In other embodiments, the formed product is a film, a fiber, or a powder. In other embodiments, the formed product may be a molded article where a majority of the product has a wall thickness of 0.6 mm or less.

Also disclosed herein in various embodiments are methods for forming an organogel, comprising: dissolving a cross-linkable polycarbonate resin in a solvent to form a solution, wherein the cross-linkable polycarbonate resin contains a photoactive group derived from a benzophenone; and exposing the solution to an effective dosage of ultraviolet radiation to cause substantial cross-linking of the polycarbonate resin and form the organogel.

The methods can further comprise separating the organogel from residual solvent, or may further comprise drying the organogel. The mass ratio of polymer to solvent in the solution may be from 10% to 50% prior to UV exposure. The solution can be exposed to ultraviolet radiation having a wavelength between 280 nm and 380 nm. The solution may be exposed to ultraviolet radiation for at least 360 seconds.

Disclosed in various embodiments herein are products having improved scratch resistance, comprising: a cross-linked layer formed from a cross-linkable polycarbonate resin containing a photoactive group derived from a dihydroxybenzophenone. The product may have a scratch rating of HB or harder according to ASTM D3363-05.

In some embodiments, the product further comprises a substrate layer formed from a substrate resin and bonded to the crosslinked layer. The crosslinked layer may be from about 2% to about 40% of the thickness of the product. The crosslinked layer may have a thickness of about 2.5 micrometers to about 12.7 millimeters. The substrate resin may be a polycarbonate film.

The cross-linkable polycarbonate resin may be formed from a reaction comprising: the dihydroxybenzophenone; a first diol chain extender; and a first linker moiety comprising a plurality of linking groups, wherein each linking group can react with the hydroxyl groups of the dihydroxybenzophenone and the first diol chain extender.

In particular embodiments, the cross-linkable polycarbonate resin contains from about 0.5 mole % to about 50 mole % of repeating units derived from the dihydroxybenzophenone. In other specific embodiments, the dihydroxybenzophenone is 4,4'-dihydroxybenzophenone; the diol chain extender is bisphenol-A; and the first linker moiety is phosgene. The reaction can further comprise an end-capping agent selected from the group consisting of phenol, p-t-butylphenol, p-cumylphenol, octylphenol, and p-cyanophenol. The cross-linkable polycarbonate resin may contain from about 0.5 mole % to about 5 mole % of endcaps derived from the end-capping agent. Sometimes, the cross-linkable polycarbonate resin contains a second diol chain extender, and the cross-linkable polycarbonate resin is a terpolymer.

In some embodiments of the product, the crosslinked layer further comprises a polymeric base resin which is different from the cross-linkable polycarbonate resin, and/or further comprises a flame retardant.

Also disclosed in various embodiments are processes for making a product having improved scratch resistance, comprising: extruding a film layer comprising a cross-linkable polycarbonate resin containing a photoactive group derived from a dihydroxybenzophenone; and exposing the film layer to ultraviolet light to induce crosslinking in the film layer.

The film layer can be co-extruded with a substrate resin that forms a substrate layer bonded to the film layer. Sometimes, the film layer further comprises a polymeric base resin. The product can be exposed to from about 6 J/cm$^2$ to about 36 J/cm$^2$ of UVA radiation on opposite sides of the product. The product may be exposed to ultraviolet radiation having a wavelength between 280 nm and 380 nm.

Also disclosed herein are methods of using a scratch-resistant film for in-mold decorating, comprising: inserting the scratch-resistant film into a molding tool; and injecting a molten plastic into the molding tool to bond with or encapsulate the scratch-resistant film; wherein the scratch-resistant film is formed by exposing a cross-linkable polycarbonate resin containing a photoactive group derived from a dihydroxybenzophenone to ultraviolet radiation to induce cross-linking and obtain the scratch-resistant film.

These and other non-limiting characteristics are more particularly described below.

BRIEF DESCRIPTION OF THE DRAWINGS

The following drawings are presented to illustrate the exemplary embodiments disclosed herein and not to limit them.

DETAILED DESCRIPTION

Figure 1:
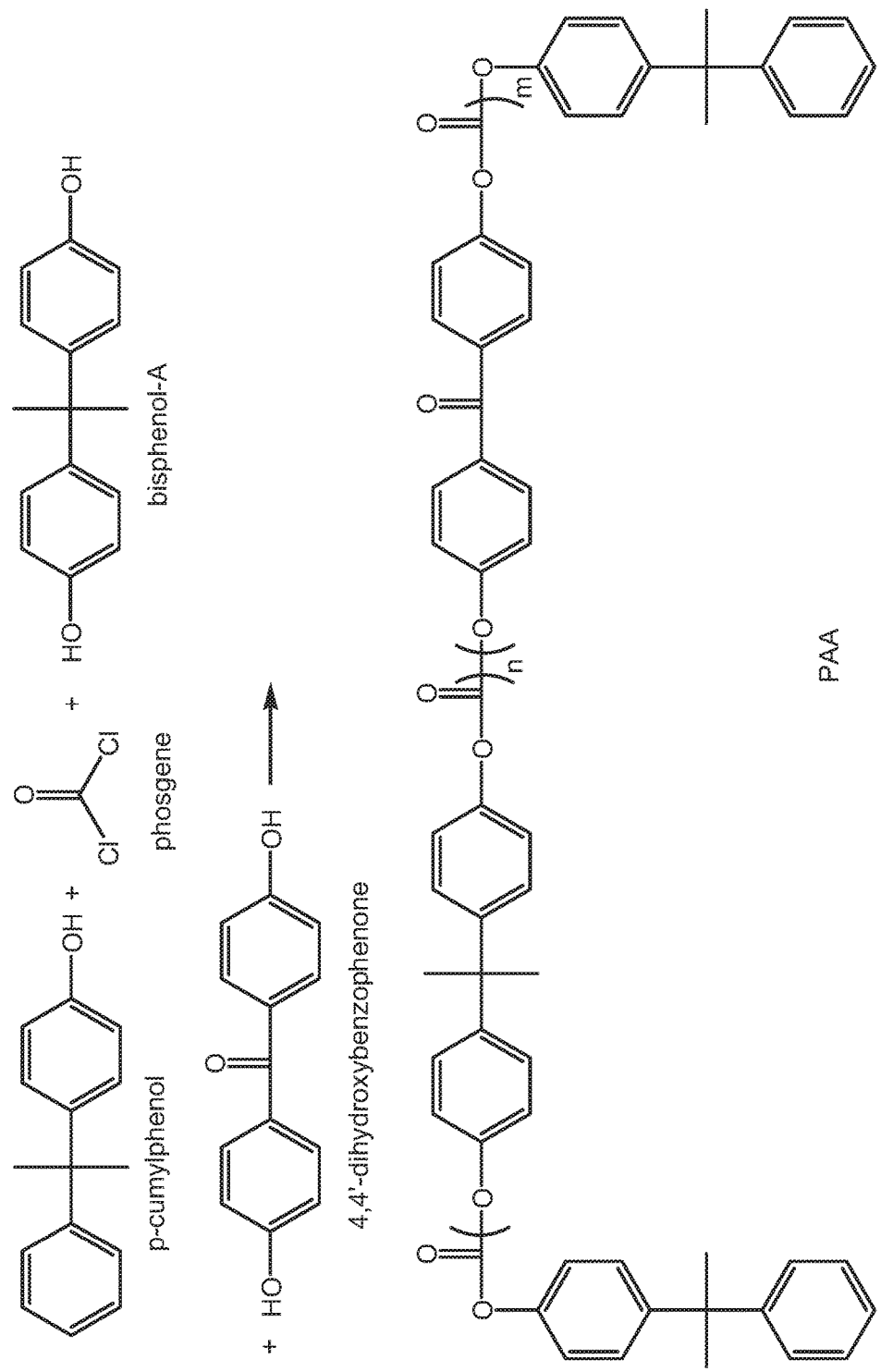
FIG. 1 illustrates the formation of a cross-linkable polycarbonate resin (oligomer/polymer) from a dihydroxybenzophenone (4,4'-dihydroxybenzophenone), a first linker moiety (phosgene), a diol chain extender (bisphenol-A), and an end-capping agent (p-cumylphenol).

In the following specification, the examples, and the claims which follow, reference will be made to some terms which are defined as follows.

Definitions

Unless otherwise defined, all technical and scientific terms used herein have the same meaning as commonly understood by one of ordinary skill in the art. In case of conflict, the present document, including definitions, will control. All publications, patent applications, patents and other references mentioned herein are incorporated by reference in their entirety.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values used herein should be understood to include numerical values which are the same when reduced to the same number of significant figures and numerical values which differ from the stated value by less than the experimental error of the measurement technique described for determining the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can carry without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

Compounds are described using standard nomenclature. Any position not substituted by an indicated group is understood to have its valency filled by a bond or a hydrogen atom. A dash ("-") that is not between two letters indicates a point of attachment for a substituent, e.g. —CHO attaches through the carbon atom.

The term "aliphatic" refers to an array of atoms that is not aromatic. The backbone of an aliphatic group is composed exclusively of carbon. An aliphatic group is substituted or unsubstituted. Exemplary aliphatic groups are ethyl and isopropyl.

An "aromatic" radical has a ring system containing a delocalized conjugated pi system with a number of pi-electrons that obeys Hückel's Rule. The ring system may include heteroatoms (e.g. N, S, Se, Si, O), or may be composed exclusively of carbon and hydrogen. Aromatic groups are not substituted. Exemplary aromatic groups include phenyl, thienyl, naphthyl, and biphenyl.

An "ester" radical has the formula —CO—O—, with the carbon atom and the oxygen atom both bonded to carbon atoms. A "carbonate" radical has the formula —O—CO—O—, with the oxygen atoms both bonded to carbon atoms. Note that a carbonate group is not an ester group, and an ester group is not a carbonate group.

A "hydroxyl" radical has the formula —OH, with the oxygen atom bonded to a carbon atom. A "carboxy" or "carboxyl" radical has the formula —COOH, with the carbon atom bonded to another carbon atom. A carboxyl group can be considered as having a hydroxyl group. However, please note that a carboxyl group participates in certain reactions differently from a hydroxyl group. An "anhydride" radical has the formula —CO—O—CO—, with the carbonyl carbon atoms bonded to other carbon atoms. This radical can be considered equivalent to two carboxyl groups. The term "acid halide" refers to a radical of the formula —CO—X, with the carbon atom bonded to another carbon atom.

The term "alkyl" refers to a fully saturated radical composed entirely of carbon atoms and hydrogen atoms. The alkyl radical may be linear, branched, or cyclic. The term "aryl" refers to an aromatic radical composed exclusively of carbon and hydrogen. Exemplary aryl groups include phenyl, naphthyl, and biphenyl. The term "hydrocarbon" refers to a radical which is composed exclusively of carbon and hydrogen. Both alkyl and aryl groups are considered hydrocarbon groups. The term "heteroaryl" refers to an aromatic radical containing at least one heteroatom. Note that "heteroaryl" is a subset of aromatic, and is exclusive of "aryl".

The term "halogen" refers to fluorine, chlorine, bromine, and iodine. The term "halo" means that the substituent to which the prefix is attached is substituted with one or more independently selected halogen radicals.

The term "alkoxy" refers to an alkyl radical which is attached to an oxygen atom, i.e. —O—$C_nH_{2n+1}$. The term "aryloxy" refers to an aryl radical which is attached to an oxygen atom, e.g. —O—$C_6H_5$.

An "alkenyl" radical is composed entirely of carbon atoms and hydrogen atoms and contains a carbon-carbon double bond that is not part of an aromatic structure. An exemplary alkenyl radical is vinyl (—CH═$CH_2$).

The term "alkenyloxy" refers to an alkenyl radical which is attached to an oxygen atom, e.g. —O—CH═$CH_2$. The term "arylalkyl" refers to an aryl radical which is attached to an alkyl radical, e.g. benzyl (—$CH_2$—$C_6H_5$). The term "alkylaryl" refers to an alkyl radical which is attached to an aryl radical, e.g. tolyl (—$C_6H_4$—$CH_3$).

The term "substituted" refers to at least one hydrogen atom on the named radical being substituted with another functional group, such as halogen, —CN, or —$NO_2$. However, the functional group is not hydroxyl, carboxyl, ester, acid halide, or anhydride. Besides the aforementioned functional groups, an aryl group may also be substituted with alkyl or alkoxy. An exemplary substituted aryl group is methylphenyl.

The term "copolymer" refers to a polymer derived from two or more structural units or monomeric species, as opposed to a homopolymer, which is derived from only one structural unit or monomer.

The terms "Glass Transition Temperature" or "Tg" refer to the maximum temperature that a polycarbonate will retain at least one useful property such as impact resistance, stiffness, strength, or shape retention. The Tg can be determined by differential scanning calorimetry.

The term "haze" refers to the percentage of transmitted light, which in passing through a specimen deviates from the incident beam by forward scattering. Percent (%) haze may be measured according to ASTM D1003-13.

The term "Melt Volume Rate" (MVR) or "Melt Flow Rate (MFR)" refers to the flow rate of a polymer in a melt phase as determined using the method of ASTM D1238-13. MVR is expressed in cubic centimeter per 10 minutes, and MFR is expressed in grams per 10 minutes. The higher the MVR or MFR value of a polymer at a specific temperature, the greater the flow of that polymer at that specific temperature.

The term "percent light transmission" or "% T" refers to the ratio of transmitted light to incident light, and may be measured according to ASTM D1003-13.

"Polycarbonate" as used herein refers to an oligomer or a polymer comprising residues of one or more monomers, joined by carbonate linkages.

The terms "UVA", "UVB", "UVC", and "UVV" as used herein were defined by the wavelengths of light measured with the radiometer (EIT PowerPuck) used in these studies, as defined by the manufacturer (EIT Inc., Sterling, Va.). "UV" radiation refers to wavelengths of 200 nm to 450 nm. UVA refers to the range from 320-390 nm, UVB to the range from 280-320 nm, UVC to the range from 250-260 nm, and UVV to the range from 395-445 nm.

The term "crosslink" and its variants refer to the formation of a stable covalent bond between two oligomers/polymers. This term is intended to encompass the formation of covalent bonds that result in network formation, or the formation of covalent bonds that result in chain extension. The term "cross-linkable" refers to the ability of a polymer/oligomer to initiate the formation of such stable covalent bonds.

The present disclosure refers to "polymers," "oligomers", and "compounds". A polymer is a large molecule composed of multiple repeating units chained together. Different molecules of a polymer will have different lengths, and so a polymer has a molecular weight that is based on the average value of the molecules (e.g. weight average or number average molecular weight). An "oligomer" has only a few repeating units, while a "polymer" has many repeating units. In this disclosure, "oligomer" refers to molecules having a weight average molecular weight (Mw) of less than 15,000, and the term "polymer" refers to molecules having an Mw of 15,000 or more, as measured by GPC using polycarbonate molecular weight standards, measured prior to any UV exposure. In a compound, all molecules have the same molecular weight. Molecular weights are reported herein in Daltons or g/mol.

The term "network" and its variants refer to a state of the polymer equivalent to the 1996 IUPAC definition of network for macromolecules. In this disclosure, covalent networks are formed when the number of crosslinking reactions is sufficient to create one single macromolecule that encompasses a majority of the entire article. These covalent networks may contain crosslinkable polymer, or loose ends, which are connected to the network by a single connection point. The article may still contain crosslinkable polymer along with the formed network. These networks are also referred to as the "insoluble mass" in this disclosure.

The present disclosure also refers to "substantially cross-linked" articles. An article is considered to be "substantially cross-linked" if a network is present throughout the article, which can be defined by an insoluble mass percentage of 80% or higher or if the article retains dimensional stability upon exposure to temperatures above the glass transition temperature. The insoluble mass of the article is the network formed after exposure of the article to form crosslinks. To determine a mass percent of insoluble material, the article mass is recorded, then placed in methylene chloride or other compatible solvent for a period of 24 hours to extract any non-crosslinked polymer. The article is then dried and weighed again. The total weight of the article after extraction divided by the weight of the article prior to extraction is the insoluble mass percentage. The second determination method is resistance to flow above the glass transition temperature. A crosslinked article should retain dimensional stability upon a thermal cycle above the glass transition temperature. During this heat exposure, parts can still warp or deflect if residual stress was generated during the article formation process.

The term "film" refers to an article with two continuous surfaces having a length and a width, and having a thickness between the two continuous surfaces. The two surfaces are generally parallel to each other, though the surfaces may have some roughness. A film has a maximum thickness of 0.25 millimeters.

The term "sheet" refers to an article with two continuous surfaces having a length and a width, and having a thickness between the two continuous surfaces. The two surfaces are generally parallel to each other, though the surfaces may have some roughness. A sheet has a minimum thickness of greater than 0.25 millimeters.

The term "thin walled" refers to an article having a maximum thickness of 1 mm or less.

Articles

The present disclosure relates to cross-linkable polycarbonate resins which can be used as photoactive additives. The additives can be used alone or blended with another polymeric base resin to form an article. When exposed to UV light of the appropriate wavelength(s), the resulting article will be substantially cross-linked and have improved anti-drip and flame retardant properties. The additives can also be used to make a film layer for a product, such as a film, sheet, or thin walled article. Such compositions, blended or neat, can be used to provide thin-walled materials that are UL94 5VA compliant and highly transparent.

Generally, the photoactive additives of the present disclosure are cross-linkable polycarbonate resins that contain photoactive ketone groups. The term "photoactive" refers to a moiety that, when exposed to ultraviolet light of the appropriate wavelength, crosslinks with another molecule. For example, the bisphenol-A monomer in a bisphenol-A homopolycarbonate is not considered to be photoactive, even though photo-Fries rearrangement can occur, because the atoms do not crosslink, but merely rearrange in the polymer backbone. A "ketone group" is a carbonyl group (—CO—) that is bonded to two other carbon atoms (i.e. —R—CO—R'—). An ester group and a carboxylic acid group are not a ketone group because their carbonyl group is bonded to an oxygen atom.

The photoactive additive is formed from a reaction mixture containing at least a benzophenone and a first linker moiety. The benzophenone has either one or two phenolic groups, and provides a photoactive ketone group for cross-linking. The first linker moiety comprises a plurality of functional groups that can react with the phenolic group(s) of the benzophenone. The reaction product of this mixture is the photoactive additive. Depending on whether the benzophenone is monofunctional or difunctional, an end-capping agent may also be included. As desired, a diol chain extender can also be included. The end-capping agent and the diol chain extender do not have photoactive properties.

In some embodiments, the benzophenone is a monohydroxybenzophenone, and has the structure of Formula (I):

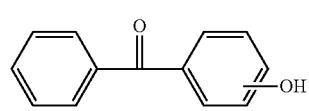

Formula (I)

In more specific embodiments, the monohydroxybenzophenone is 4-hydroxybenzophenone (4-HBP).

In other embodiments, the benzophenone is a dihydroxybenzophenone, and has the structure of Formula (II):

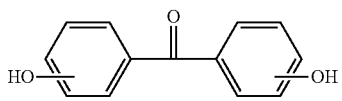
Formula (II)

The two hydroxyl groups can be located in any combination of locations, e.g. 4,4'-; 2,2'-; 2,4'-; etc. In more specific embodiments, the dihydroxybenzophenone is 4,4'-dihydroxybenzophenone (4,4'-DHBP).

The photoactive hydroxybenzophenone is reacted with one or more first linker moieties. At least one of the first linker moieties comprises a plurality of functional groups that can react with the phenolic group of the photoactive benzophenones. Examples of such functional groups include a carboxylic acid (and anhydrides thereof), an acyl halide, an alkyl ester, and an aryl ester. These functional groups have the general formula —COY, wherein Y is hydroxyl, halogen, alkoxy, or aryloxy. The functional groups can be joined to an aliphatic group or an aromatic group which serves as a "backbone" for the linker moiety. In particular embodiments, the first linker moiety can have two, three, four, or even more functional groups. As a result, depending on its identity and on the other ingredients in the reaction, the first linker moiety can act as a branching agent.

Some examples of first linker moieties which have two functional groups and can react with the photoactive hydroxybenzophenones include those having the structure of one of formulas (1)-(4):

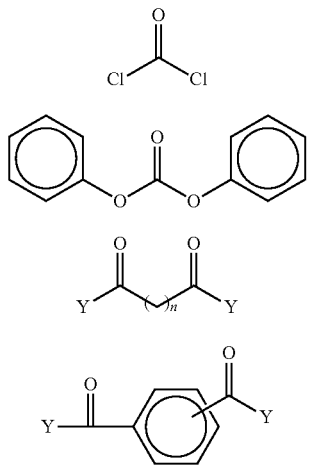

Formula (1)

Formula (2)

Formula (3)

Formula (4)

where Y is hydroxyl, halogen, alkoxy, or aryloxy; and where n is 1 to 20. It should be noted that Formula (3) encompasses adipic acid (n=4), sebacic acid (n=8), and dodecanedioic acid (n=10). Similarly, Formula (4) encompasses isophthalic acid and terephthalic acid. When diacids are used, the crosslinkable polycarbonate of the present disclosure may be a polyester-polycarbonate. The molar ratio of ester units to carbonate units in the polyester-polycarbonate may be 1:99 to 99:1, specifically 10:90 to 90:10, or 25:75 to 75:25.

Some examples of first linker moieties which have three functional groups and can react with the photoactive hydroxybenzophenones include those having the structure of one of the Formulas (5)-(7):

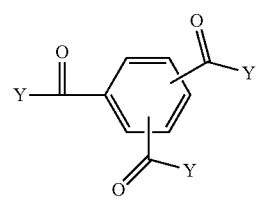
Formula (5)

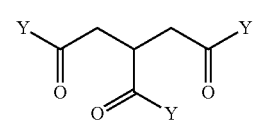
Formula (6)

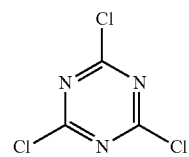
Formula (7)

where Y is hydroxyl, halogen, alkoxy, or aryloxy.

Some examples of first linker moieties which have four functional groups and can react with the photoactive hydroxybenzophenones include those having the structure of one of Formulas (8)-(10):

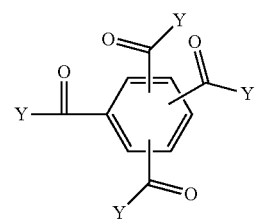
Formula (8)

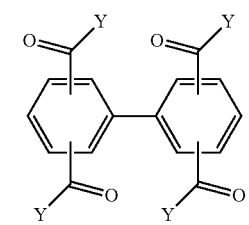
Formula (9)

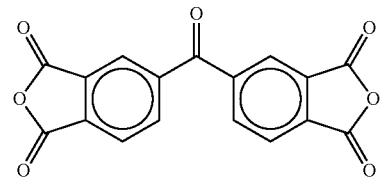
Formula (10)

where Y is hydroxyl, halogen, alkoxy, or aryloxy.

In some embodiments, functional groups can be provided by short oligomers, including oligomers containing glycidyl methacrylate monomers with styrene or methacrylate monomers, or epoxidized novolac resins. These oligomers can permit the desired number of functional groups to be provided. Such oligomers are generalized by the structure of Formula (11):

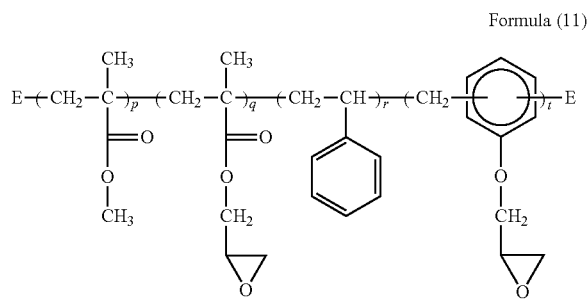

Formula (11)

where E is hydrogen or an end-capping agent, p is the number of methacrylate monomers, q is the number of methacrylate monomers, r is the number of styrene monomers, and t is the number of epoxidized novolac (phenol-formaldehyde) monomers. Generally p+q+r+t≤20. When the oligomer contains glycidyl methacrylate monomers with styrene or methacrylate monomers, generally t=0 and q≥1. Similarly, for novolac resins, p=q=r=0. The epoxy groups can be reacted with the phenolic group of the photoactive benzophenone.

It is noted that using phosgene and diphenyl carbonate, Formulas (1) and (2) respectively, will result in the formation of carbonate linkages, while using the other first linker moieties will generally result in the formation of ester linkages. In particular embodiments, phosgene or diphenyl carbonate is used as the first linker moiety.

When the benzophenone is a monohydroxybenzophenone, the molar ratio of the benzophenone to the first linker moiety can be from 1:2 to 1:200 prior to UV exposure, including from about 1:10 to about 1:200 or from about 1:20 to about 1:200. When the benzophenone is a dihydroxybenzophenone, the molar ratio of the benzophenone to the first linker moiety can be from 1:1 to 1:200 prior to UV exposure, including from 1:2 to 1:200, or from about 1:99 to about 3:97, or from about 1:99 to about 6:94, or from about 10:90 to about 25:75 or from about 1:3 to about 1:200.

In particularly desired embodiments, the photoactive additive can be formed from a reaction mixture containing the photoactive benzophenone, the first linker moiety, and one or more diol chain extenders. The diol chain extender is a molecule that contains only two hydroxyl groups and is not photoactive when exposed to light. The chain extender can be used to provide a desired level of miscibility. The photoactive additive may comprise from about 75 mole % to about 99.5 mole %, or from 95 mole % to about 99 mole %, or from about 80 mole % to about 95 mole %, or from about 80 mole % to about 90 mole %, of the diol chain extender.

A first exemplary diol chain extender is a bisphenol of Formula (A):

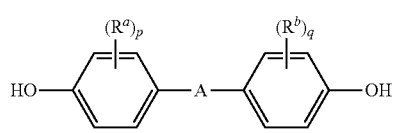

Formula (A)

wherein $R^a$ and $R^b$ each represent a halogen atom or a monovalent hydrocarbon group and may be the same or different; p and q are each independently integers of 0 to 4; and A represents one of the groups of Formula (A-1):

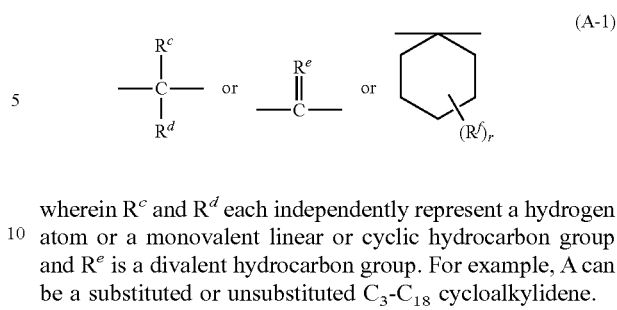

(A-1)

wherein $R^c$ and $R^d$ each independently represent a hydrogen atom or a monovalent linear or cyclic hydrocarbon group and $R^e$ is a divalent hydrocarbon group. For example, A can be a substituted or unsubstituted $C_3$-$C_{18}$ cycloalkylidene.

Specific examples of the types of bisphenol compounds that may be represented by Formula (A) include 2,2-bis(4-hydroxyphenyl) propane ("bisphenol-A" or "BPA"), 4,4'-(1-phenylethane-1,1-diyl)diphenol or 1,1-bis(4-hydroxyphenyl)-1-phenylethane (bisphenol-AP); 1,1-bis(4-hydroxyphenyl)-3,3,5-trimethylcyclohexane) (bisphenol TMC); 1,1-bis(4-hydroxy-3-methylphenyl) cyclohexane (DMBPC); and 2,2-bis(3,5-dibromo-4-hydroxyphenyl) propane (tetrabromobisphenol-A or TBBPA).

A second exemplary diol chain extender is a bisphenol of Formula (B):

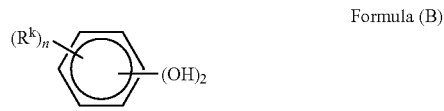

Formula (B)

wherein each $R^k$ is independently a $C_{1-10}$ hydrocarbon group, and n is 0 to 4. The halogen is usually bromine. Examples of compounds that may be represented by Formula (B) include resorcinol, 5-methyl resorcinol, 5-phenyl resorcinol, catechol; hydroquinone; and substituted hydroquinones such as 2-methyl hydroquinone.

A third exemplary diol chain extender is a bisphenolpolydiorganosiloxane of Formula (C-1) or (C-2):

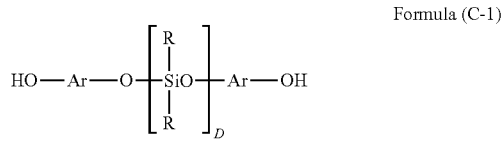

Formula (C-1)

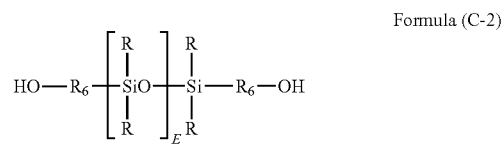

Formula (C-2)

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, including from about 2 to about 500, or about 10 to about 200, or more specifically about 10 to about 75.

Specific examples of Formulas (C-1) and (C-2) are illustrated below as Formulas (C-a) through (C-d):

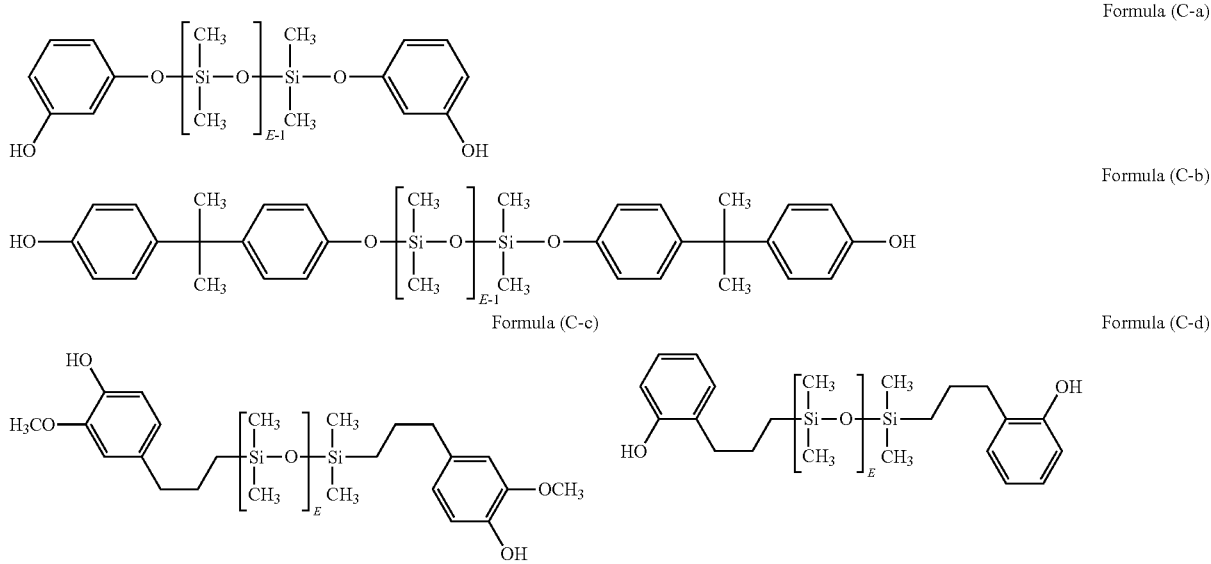

where E is an average value from 10 to 200.

A fourth exemplary diol chain extender is an aliphatic diol of Formula (D):

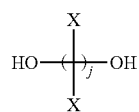

Formula (D)

wherein each X is independently hydrogen, halogen, or alkyl; and j is an integer from 1 to 20. Examples of an aliphatic diol include ethylene glycol, propanediol, 2,2-dimethyl-propanediol, 1,6-hexanediol, and 1,12-dodecanediol.

A fifth exemplary diol chain extender is a dihydroxy compound of Formula (E), which may be useful for high heat applications:

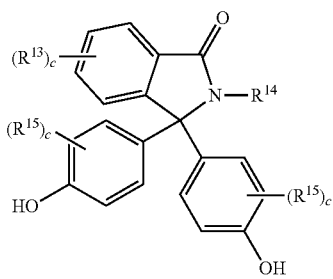

Formula (E)

wherein $R^{13}$ and $R^{15}$ are each independently halogen or $C_1$-$C_6$ alkyl, $R^{14}$ is $C_1$-$C_6$ alkyl, or phenyl substituted with up to five halogens or $C_1$-$C_6$ alkyl groups, and c is 0 to 4. In specific embodiments, $R^{14}$ is a $C_1$-$C_6$ alkyl or phenyl group; or each c is 0. Compounds of Formula (E) include 3,3-bis(4-hydroxyphenyl)-2-phenylisoindolin-1-one (PPPBP).

Another dihydroxy chain extender that might impart high Tgs to the polycarbonate has adamantane units. Such compounds may have repetitive units of the following formula (F) for high heat applications:

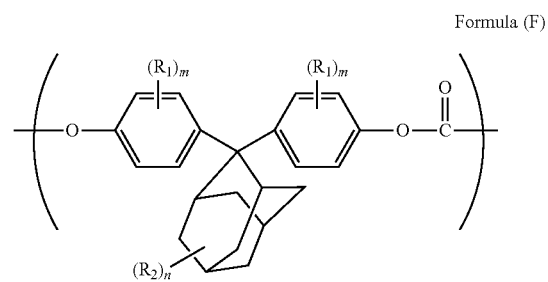

Formula (F)

wherein $R_1$ is halogen, $C_1$-$C_6$ alkyl, $C_1$-$C_6$ alkoxy, $C_6$-$C_{12}$ aryl, $C_7$-$C_{13}$ aryl-substituted alkenyl, or $C_1$-$C_6$ fluoroalkyl; $R_2$ is halogen, $C_1$-$C_{12}$ alkyl, $C_1$-$C_{12}$ alkoxy, $C_6$-$C_{12}$ aryl, $C_7$-$C_{13}$ aryl-substituted alkenyl, or $C_1$-$C_{12}$ fluoroalkyl; m is an integer of 0 to 4; and n is an integer of 0 to 14.

Another dihydroxy compound that might impart high Tgs to the polycarbonate is a fluorene-unit containing dihydroxy compound represented by the following Formula (G):

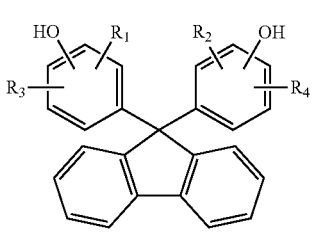

Formula (G)

wherein $R_1$ to $R_4$ are each independently hydrogen, $C_1$-$C_9$ hydrocarbon, or halogen.

Another diol chain extender that could be used is an isosorbide. A monomer unit derived from isosorbide may be an isorbide-bisphenol unit of Formula (H):

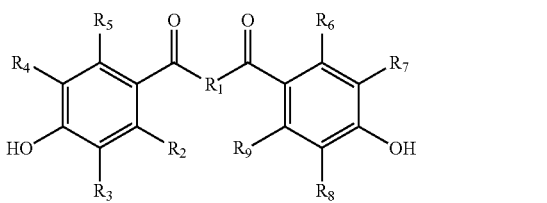

Formula (H)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (H-a):

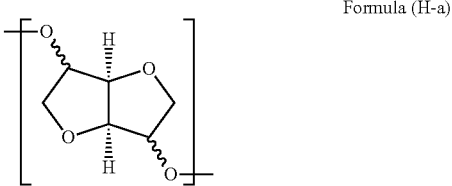

Formula (H-a)

The isosorbide unit may be derived from one isosorbide, or be a mixture of isomers of isosorbide. The stereochemistry of Formula (I) is not particularly limited. These diols may be prepared by the dehydration of the corresponding hexitols. The isosorbide-bisphenol may have a pKa of between 8 and 11.

As previously explained, a photoactive hydroxybenzophenone is reacted with a first linker moiety to obtain the photoactive additive. In some embodiments, a secondary linker moiety is included in the reaction mixture. The secondary linker moiety has at least three functional groups, each of which can react with the functional groups of the first linker moiety, and acts as a branching agent. Generally, the functional groups of the secondary linker moiety are hydroxyl groups.

Some examples of secondary linker moieties which have three functional groups and can react with the first linker moiety include 1,1,1-trimethoxyethane; 1,1,1-trimethoxymethane; 1,1,1-tris (hydroxyphenyl) ethane (THPE), and 1,3,5-tris[2-(4-hydroxyphenyl)-propan-2-yl] benzene. Some examples of secondary linker moieties which have four functional groups and can react with the first linker moiety include pentaerythritol and 4-[2,6,6-tris (4-hydroxyphenyl)heptan-2-yl]phenol. In other embodiments, the secondary linker moiety can be an oligomer, made from epoxidized novolac monomer, that permits the desired number of functional groups to be provided.

An end-capping agent is generally used to terminate any polymer chains of the photoactive additive. The end-capping agent (i.e. chain stopper) can be a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. Unless modified with other adjectives, the term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from this non-photoactive. It is noted that when the photoactive hydroxybenzophenone is a monohydroxybenzophenone, the monohydroxybenzophenone acts as an end-capping agent. In that situation, a second end-capping agent can also be used. The photoactive additive may comprise about 0.5 mole % to about 5.0 mole % endcap groups derived from the end-capping agent, including about 1 mole % to about 3 mole %, or from about 1.7 mole % to about 2.5 mole %, or from about 2 mole % to about 2.5 mole %, or from about 2.5 mole % to about 3.0 mole % endcap groups derived from the end-capping agent.

The photoactive additives of the present disclosure have photoactive groups that are derived from either a monohydroxybenzophenone or a dihydroxybenzophenone. When a monohydroxybenzophenone is used, the reaction mixture generally also includes a diol chain extender and a first linker moiety. The diol chain extender provides a monomer, and the monohydroxybenzophenone acts as an endcapping agent. The resulting additive can be considered a homopolymer. If desired, a secondary linker moiety can also be used. When a dihydroxybenzophenone is used, the reaction mixture generally also includes the first linker moiety, an endcapping agent, and a diol chain extender. The resulting additive can be considered a copolymer with the dihydroxybenzophenone and the diol chain extender acting as monomers.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. These molecular weights are measured prior to any UV exposure. The Mw may be varied as desired. In some particular embodiments, the Mw of the photoactive additives is about 5,000 or less.

One example of a photoactive additive is a cross-linkable polycarbonate resin shown in FIG. 1. Here, 4,4'-dihydroxybenzophenone is reacted with phosgene (first linker moiety), bisphenol-A (diol chain extender), and p-cumylphenol (endcapping agent) to obtain the cross-linkable polycarbonate resin. A copolymer is thus formed with a weight average molecular weight and a polydispersity index, and containing carbonate linkages.

Figure 2:
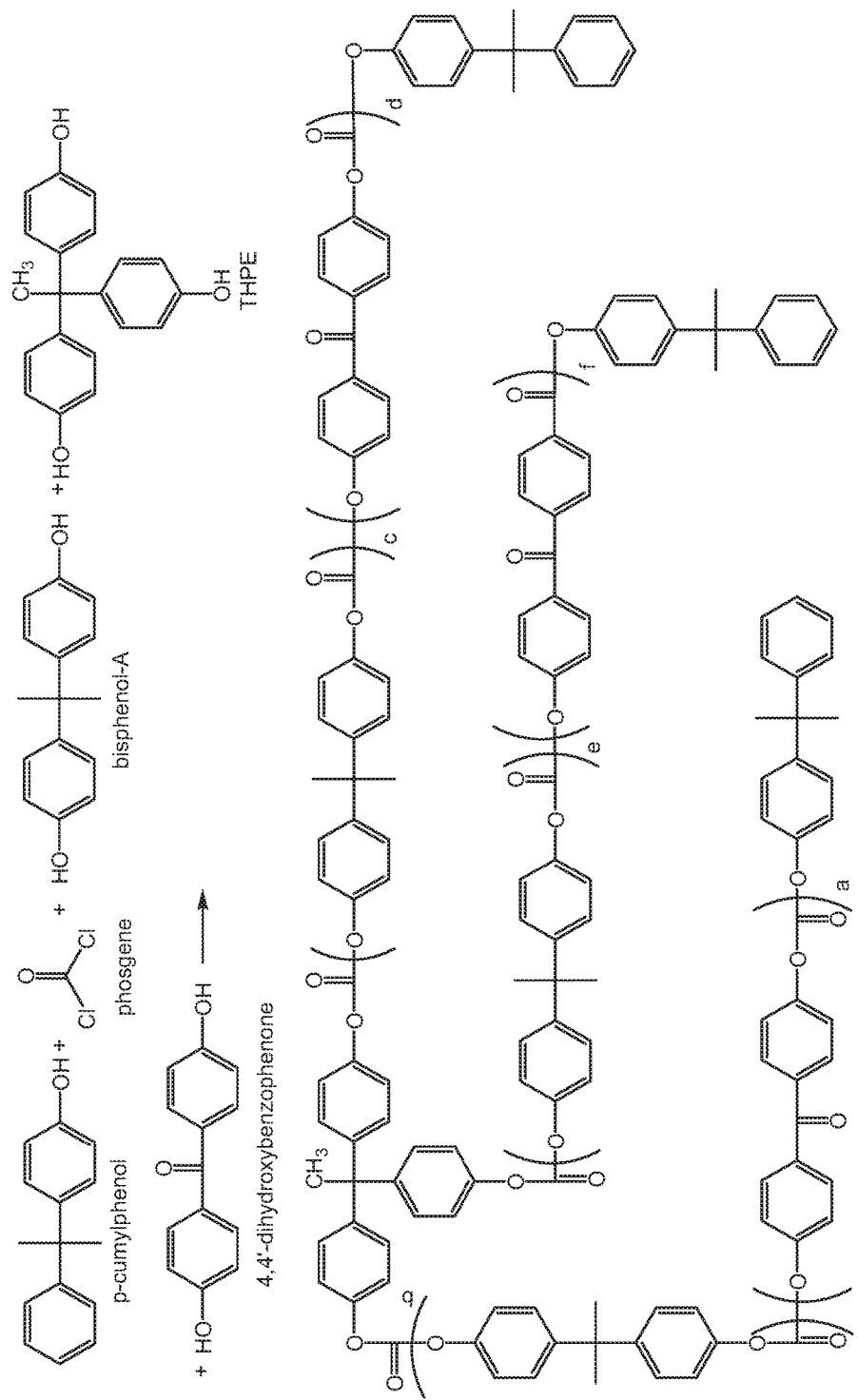
FIG. 2 illustrates the formation of a branched cross-linkable polycarbonate (oligomer/polymer) from a dihydroxybenzophenone (4,4'-dihydroxybenzophenone), a first linker moiety (phosgene), a diol chain extender (bisphenol-A), an end-capping agent (p-cumylphenol), and a secondary linker moiety (1,1,1-tris-hydroxyphenylethane (THPE)).

FIG. 2 illustrates the formation of a branched crosslinkable polycarbonate. As illustrated here, 4,4'-dihydroxybenzophenone is reacted with phosgene (first linker moiety), bisphenol-A (diol chain extender), p-cumylphenol (endcapping agent), and a secondary linker moiety (1,1,1-trishydroxyphenylethane (THPE)). A copolymer is thus formed.

Figure 3:
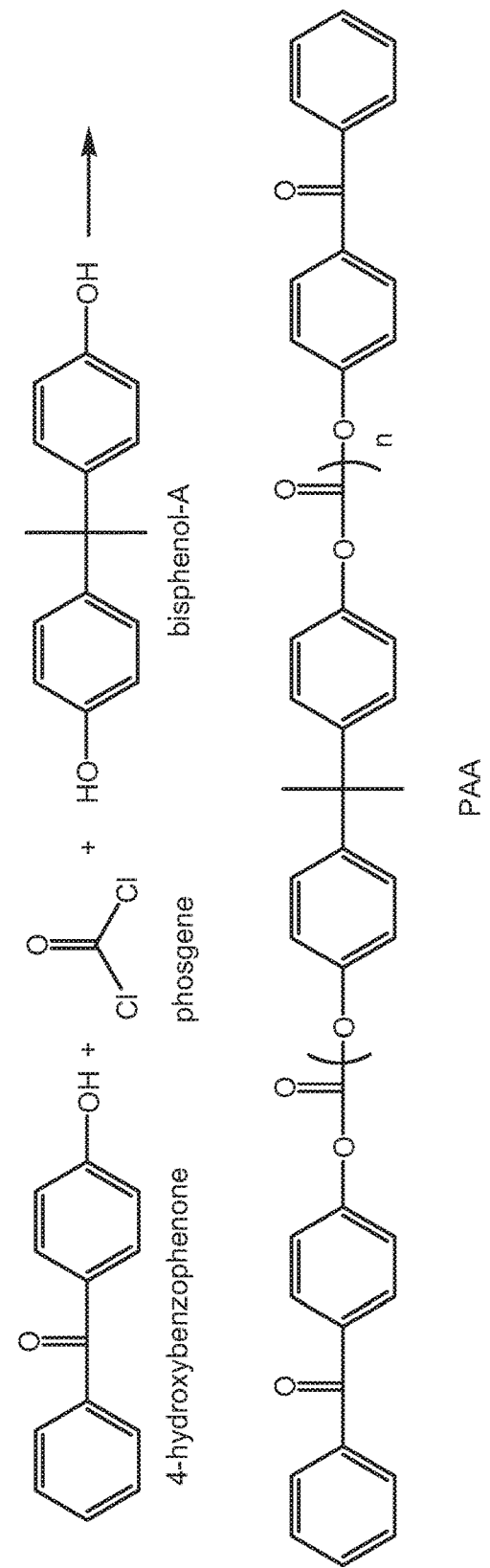
FIG. 3 illustrates the formation of a cross-linkable polycarbonate (oligomer/polymer) from a monohydroxybenzophenone (4-hydroxybenzophenone), a first linker moiety (phosgene), and a diol chain extender (bisphenol-A).

FIG. 3 illustrates the formation of another cross-linkable polycarbonate. Here, 4-hydroxybenzophenone is reacted with phosgene (first linker moiety) and bisphenol-A (diol chain extender) to obtain the cross-linkable polycarbonate resin.

Figure 4:
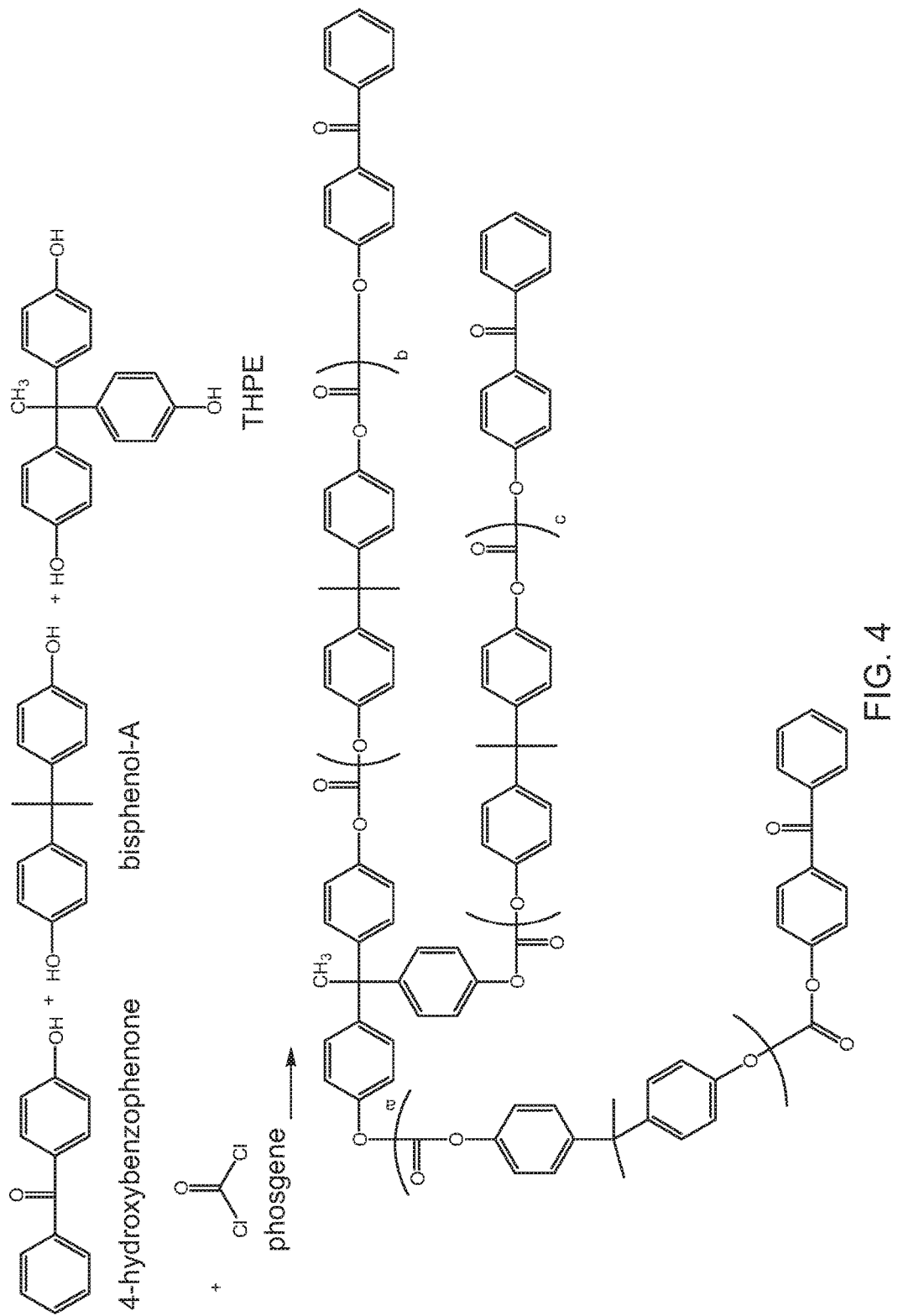
FIG. 4 illustrates the formation of a cross-linkable polycarbonate (oligomer/polymer) from a monohydroxybenzophenone (4-hydroxybenzophenone), a first linker moiety (phosgene), a diol chain extender (bisphenol-A), and an additional endcapping agent (p-cumylphenol).

FIG. 4 illustrates the formation of a cross-linkable polycarbonate. As shown here, 4-hydroxybenzophenone is reacted with phosgene (first linker moiety), bisphenol-A (diol chain extender), p-cumylphenol (end-capping agent), and a secondary linker moiety (THPE).

Figure 5:
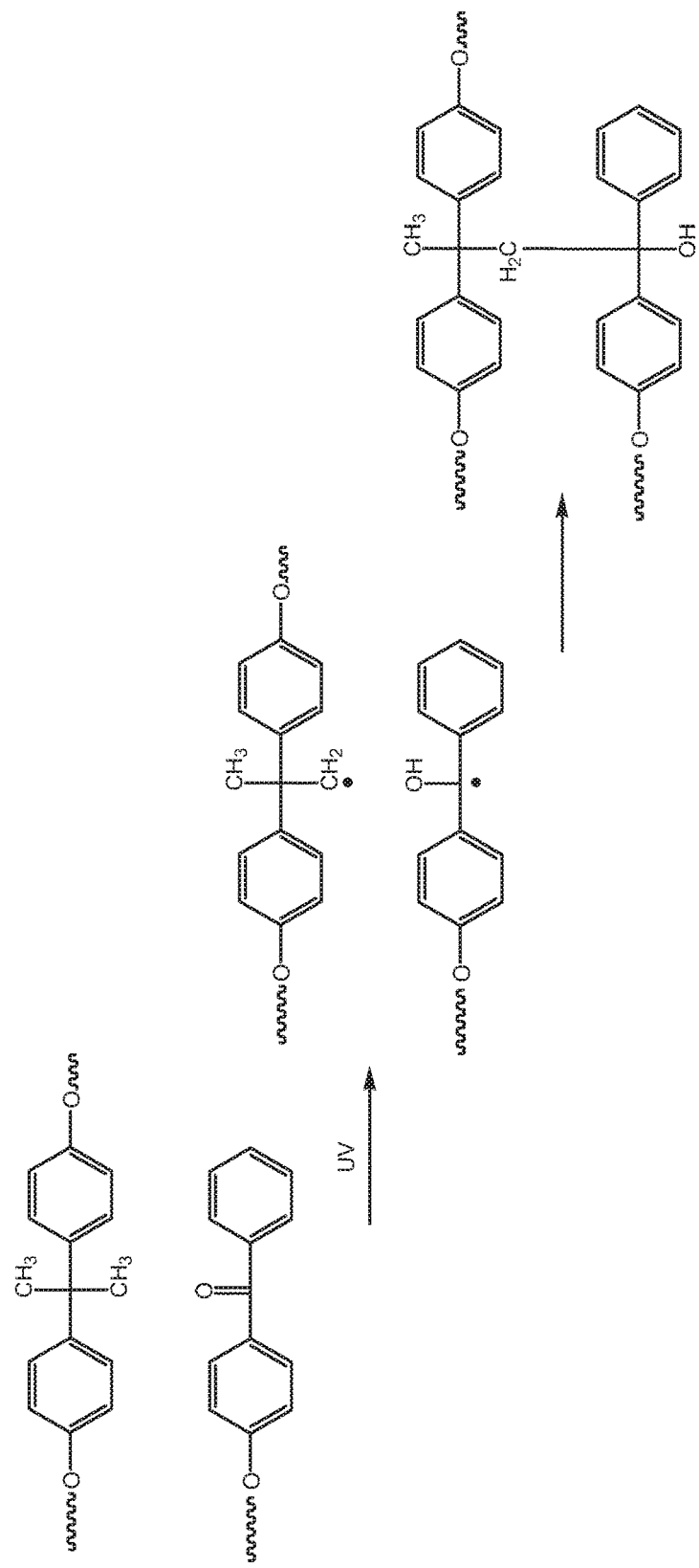
FIG. 5 illustrates the crosslinking mechanism of the cross-linkable polycarbonate.

One crosslinking mechanism of the photoactive additives is believed to be due to hydrogen abstraction by the ketone group from an alkyl group that acts as a hydrogen donor and subsequent coupling of the resulting radicals. This mechanism is illustrated in FIG. 5 with reference to a benzophenone (the photoactive moiety) and a bisphenol-A (BPA)

monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of hydrogen is critical for this reaction to occur. Other mechanisms may occur after the initial abstraction event with base resins containing unsaturated bonds or reactive side groups.

In some embodiments, the photoactive additive is a cross-linkable polycarbonate resin comprising repeating units derived from a dihydroxybenzophenone monomer (i.e. of Formula (II)). The cross-linkable polycarbonate resin may comprise from about 0.5 mole % to about 50 mole % of the dihydroxybenzophenone. In more particular embodiments, the cross-linkable polycarbonate resin comprises from about 1 mole % to about 3 mole %, or from about 1 mole % to about 5 mole %, or from about 1 mole % to about 6 mole %, or from about 5 mole % to about 20 mole %, or from about 10 mole % to about 20 mole %, or from about 0.5 mole % to about 25 mole % of the dihydroxybenzophenone. In more specific embodiments, the photoactive cross-linkable polycarbonate resin is a copolymer formed from the dihydroxybenzophenone, a diol chain extender, phosgene, and one or more end-capping agents. Most desirably, the dihydroxybenzophenone is 4,4'-dihydroxybenzophenone. Usually, the diol chain extender is bisphenol-A. In particular embodiments, the cross-linkable polycarbonate is a copolymer consisting of repeating units derived from 4,4'-dihydroxybenzophenone and bisphenol-A, with endcaps that are not photoactive. The copolymer contains from about 0.5 mole % to 50 mole % of the dihydroxybenzophenone, and from about 50 mole % to 99.5 mole % of the bisphenol-A.

In other embodiments, the photoactive additive is a cross-linkable polycarbonate resin comprising repeating units derived from a monohydroxybenzophenone monomer (i.e. of Formula (I)). The cross-linkable polycarbonate may comprise about 0.5 mole % to about 5 mole % endcap groups derived from the monohydroxybenzophenone, including from about 1 mole % to about 3 mole, or from about 1.7 mole % to about 2.5 mole %, or from about 2 mole % to about 2.5 mole %, or from about 2.5 mole % to about 3.0 mole %, or from about 3.5 mole % to about 4.0 mole % endcap groups derived from the monohydroxybenzophenone. In more specific embodiments, the photoactive cross-linkable polycarbonate resin is a homopolymer formed from the monohydroxybenzophenone, a diol chain extender, and phosgene. Most desirably, the dihydroxybenzophenone is 4-hydroxybenzophenone. Usually, the diol chain extender is bisphenol-A. In particular embodiments, the cross-linkable polycarbonate is a bisphenol-A homopolycarbonate consisting of repeating units derived from bisphenol-A, with the photoactive monohydroxybenzophenone endcaps.

In particular embodiments, the photoactive cross-linkable polycarbonate contains about 0.5 mol % of endcaps derived from a monohydroxybenzophenone, and has a weight-average molecular weight (Mw) from 17,000 to 30,000 Daltons. In other specific embodiments, the photoactive cross-linkable polycarbonate contains about 2.5 mol % of endcaps derived from a monohydroxybenzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg.

These polycarbonates, prior to cross-linking, can be provided as thermally stable high melt-flow polymers, and can thus be used to fabricate a variety of thin-walled articles (e.g., 0.6 mm or less). These articles are subsequently exposed to ultraviolet radiation to affect substantial cross-linking. The substantially cross-linked materials, in addition to flame resistance and chemical resistance, may retain or exhibit superior mechanical properties (e.g., impact resistance, ductility) as compared to the polycarbonate resin prior to cross-linking.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons], or of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm. Samples may be prepared at a concentration of about 1 milligram per milliliter (mg/ml), and eluted at a flow rate of about 1.0 milliliter per minute (ml/min).

The cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

The cross-linkable polycarbonates of the present disclosure may have a melt flow rate (MFR) of 1 to 45 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238-13 method, 1.2 kg load, 300° C. temperature, 360 second dwell.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70% wt %; 60 wt % to 75 wt %; 50 wt % to 80 wt %; or 50 wt % to 90 wt %. The biocontent may be measured according to ASTM D6866-10.

The cross-linkable polycarbonates of the present disclosure may have a modulus of elasticity of greater than or equal to (≥) 2200 megapascals (MPa), ≥2310 MPa, ≥2320 MPa, ≥2330 MPa, ≥2340 MPa, ≥2350 MPa, ≥2360 MPa, ≥2370 MPa, ≥2380 MPa, ≥2390 MPa, ≥2400 MPa, ≥2420 MPa, ≥2440 MPa, ≥2460 MPa, ≥2480 MPa, ≥2500 MPa, or ≥2520 MPa as measured by ASTM D790-10 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790-10.

The cross-linkable polycarbonates of the present disclosure may have a tensile strength at break of greater than or equal to (≥) 45 megapascals (MPa), ≥60 MPa, ≥61 MPa, ≥62 MPa, ≥63 MPa, ≥64 MPa, ≥65 MPa, ≥66 MPa, ≥67 MPa, ≥68 MPa, ≥69 MPa, ≥70 MPa, ≥71 MPa, ≥72 MPa, ≥73 MPa, ≥74 MPa, ≥75 MPa as measured by ASTM D638-10 Type I at 50 mm/min.

The cross-linkable polycarbonates of the present disclosure may possess a ductility of greater than or equal to (≥) 60%, ≥65%, ≥70%, ≥75%, ≥80%, ≥85%, ≥90%, ≥95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D256-10.

The cross-linkable polycarbonates of the present disclosure may have a notched Izod impact strength (NII) of ≥500 Joule per meter (J/m), ≥550 J/m, ≥600 J/m, ≥650 J/m, ≥700 J/m, ≥750 J/m, ≥800 J/m, ≥850 J/m, ≥900 J/m, ≥950 J/m, or ≥1000 J/m, measured at 23° C. according to ASTM D256-10.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D648-07 at 1.82 MPa, with 3.2 mm thick unannealed mm bar.

The cross-linkable polycarbonates of the present disclosure may have a percent haze value of less than or equal to (≤) 10.0%, ≤8.0%, ≤6.0%, ≤5.0%, ≤4.0%, ≤3.0%, ≤2.0%, ≤1.5%, ≤1.0%, or ≤0.5% as measured at a certain thickness according to ASTM D1003-13. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to (≥) 50%, ≥60%, ≥65%, ≥70%, ≥75%, ≥80%, ≥85%, ≥90%, ≥95%, ≥96%, ≥97%, ≥98%, ≥99%, ≥99.1%, ≥99.2%, ≥99.3%, ≥99.4%, ≥99.5%, ≥99.6%, ≥99.7%, ≥99.8%, or ≥99.9%, as measured at certain thicknesses according to ASTM D1003-13. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioeithers, aliphatic polyacetals, aliphatic polycarbonates, C—C linked polymers and polysiloxanes. The soft segments of aliphatic polyesters, aliphatic polyethers, aliphatic polythioeithers, aliphatic polyacetals, aliphatic polycarbonates may be characterized as having number average molecular weight (Mns) of greater than 600 Daltons.

Processes

An interfacial polycondensation polymerization process for bisphenol-A (BPA) based polycarbonates can be used to prepare the cross-linkable polycarbonates of the present disclosure. Although the reaction conditions for interfacial polymerization can vary, an exemplary process generally involves dissolving or dispersing one or more dihydric phenol reactants (e.g. bisphenol-A) in water, adding the resulting mixture to a water-immiscible solvent medium, and contacting the reactants with a carbonate precursor (e.g. phosgene) in the presence of a catalyst (e.g. triethylamine, TEA) and an acid acceptor such as an alkali metal hydroxide.

Four different processes are disclosed herein for producing some embodiments of the photoactive additive which contain carbonate linkages. Each process includes the following ingredients: a diol chain extender, an end-capping agent, a carbonate precursor, a base, a tertiary amine catalyst, water, and a water-immiscible organic solvent, and optionally a branching agent. It should be noted that more than one of each ingredient can be used to produce the photoactive additive. Some information on each ingredient is first provided below.

A hydroxybenzophenone is present as the photoactive moiety, and can be present either as the end-capping agent (i.e. monohydroxybenzophenone) or as a diol (i.e. dihydroxybenzophenone). In the process descriptions below, reference will be made to diols, which should be construed as referring to the dihydroxybenzophenone and the diol chain extender when a dihydroxybenzophenone monomer is used. Reference will also be made to the end-capping agent, which should be construed as referring to the monohydroxybenzophenone when a monohydroxybenzophenone monomer is used.

The diol chain extender may have the structure of any one of Formulas (A)-(H), and include monomers such as bisphenol-A.

Examples of end-capping agents (other than the monohydroxybenzophenone) include phenol, p-cumylphenol (PCP), p-tert-butylphenol, octylphenol, and p-cyanophenol.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (1) or (2).

The base is used for the regulation of the pH of the reaction mixture. In particular embodiments, the base is an alkali metal hydroxide, such as sodium hydroxide (NaOH) or potassium hydroxide (KOH).

A tertiary amine catalyst is used for polymerization. Exemplary tertiary amine catalysts that can be used are aliphatic tertiary amines such as triethylamine (TEA)), N-ethylpiperidine, 1,4-diazabicyclo[2.2.2]octane (DABCO), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

In the first process, sometimes referred to as the "upfront" process, the diol(s), end-capping agent, catalyst, water, and water-immiscible solvent are combined upfront in a vessel to form a reaction mixture. The reaction mixture is then exposed to the carbonate precursor, for example by phosgenation, while the base is co-added to regulate the pH, to obtain the photoactive additive.

The pH of the reaction mixture is usually from about 8.5 to about 10, and can be maintained by using a basic solution (e.g. aqueous NaOH). The reaction mixture is then charged with the carbonate precursor, which is usually phosgene. The carbonate precursor is added to the reaction mixture over a period of about 15 minutes to about 45 minutes. While the carbonate precursor is being added, the pH is also maintained in the range of about 8.5 to about 10, again by addition of a basic solution as needed. The cross-linkable polycarbonate is thus obtained, and is then isolated from the reaction mixture.

In the second process, also known as the "solution addition" process, the diol(s), tertiary amine catalyst, water, and water-immiscible solvent are combined in a vessel to form a reaction mixture. The total charge of the carbonate precursor is then added to this reaction mixture in the vessel over a total time period, while the base is co-added to regulate the pH. The carbonate precursor is first added to the reaction mixture along with the base to regulate the pH for a first time period. After the first time period ends, the end-capping agent is added in a controlled manner to the reaction mixture, also referred to as programmed addition. The addition of the end-capping agent occurs for a second time period after the first time period, rather than as a bolus at the beginning of the reaction (as in the upfront process). The carbonate precursor and the base are also added concurrently with the end-capping agent during the second time period. After the second time period ends, the remainder of the carbonate precursor continues uninterrupted for a third time period until the total charge is reached. The base is also co-added during the third time period to regulate the reaction pH. The pH of the reaction mixture is usually from about 8.5 to about 10, and can be maintained by using a basic solution (e.g. aqueous NaOH, made from the base). The end-capping agent is not added during either the first time period or the third time period. The photoactive additive is thus obtained. The main difference between the first and second processes is in the addition of the end-capping agent over time.

In the second process, the carbonate precursor is added to the reaction mixture over a total time period, which may be for example from about 15 minutes to about 45 minutes. The total time period is the duration needed to add the total charge of the carbonate precursor (measured either by weight or by moles) to the reaction mixture. It is contemplated that the carbonate precursor is added at a constant rate over the total time period. The carbonate precursor is first added to the reaction mixture along with the base to regulate the pH for a first time period, ranging from about 2 minutes to about 20 minutes. Then, during a second time period, the end-capping agent is added to the reaction mixture concurrently with the carbonate precursor and the base. It is contemplated that the end-capping agent is added at a constant rate during this second time period, which can range from about 1 minute to about 5 minutes. After the second time period ends, the remaining carbonate precursor is charged to the reaction mixture for a third time period, along with the base to regulate the reaction pH. The cross-linkable polycarbonate is thus obtained, and is then isolated from the reaction mixture.

The total time period for the reaction is the sum of the first time period, the second time period, and the third time period. In particular embodiments, the second time period in which the solution containing the end-capping agent is added to the reaction mixture begins at a point between 10% to about 40% of the total time period. Put another way, the first time period is 10% of the total time period.

For example, if 2400 grams of phosgene were to be added to a reaction mixture at a rate of 80 g/min, and 500 ml of a PCP solution were to be added to the reaction mixture at a rate of 500 ml/min after an initial charge of 240 grams of phosgene, then the total time period would be 30 minutes, the first time period would be three minutes, the second time period would be one minute, and the third period would be 26 minutes.

The third process is also referred to as a bis-chloroformate or chlorofomate (BCF) process. Chloroformate oligomers are prepared by reacting the carbonate precursor, specifically phosgene, with the diol(s) in the absence of the tertiary amine catalyst, while the base is co-added to regulate the pH. The chloroformate oligomers can contain a mixture of monochloroformates, bischloroformates, and bisphenol terminated oligomers. After the chloroformate oligomers are generated, the phosgene can optionally be allowed to substantially condense or hydrolyze, then the end-capping agent is added to the chloroformate mixture. The reaction is allowed to proceed, and the tertiary amine catalyst is added to complete the reaction. The pH of the reaction mixture is usually from about 8.5 to about 10 prior to the addition of the phosgene. During the addition of the phosgene, the pH is maintained between about 6 and about 8, by using a basic solution (e.g. aqueous NaOH).

The fourth process uses a tubular reactor. In the tubular reactor, the end-capping agent is pre-reacted with the carbonate precursor (specifically phosgene) to form chloroformates. The water-immiscible solvent is used as a solvent in the tubular reactor. In a separate reactor, the diol(s), tertiary amine catalyst, water, and water-immiscible solvent are combined to form a reaction mixture. The chloroformates in the tubular reactor are then fed into the reactor over a first time period along with additional carbonate precursor to complete the reaction while the base is co-added to regulate the pH. During the addition of the chloroformates, the pH is maintained between about 8.5 and about 10, by using a basic solution (e.g. aqueous NaOH).

The resulting cross-linkable polycarbonate formed by any of these processes contains only a small amount of low-molecular-weight components. This can be measured in two different ways: the level of diarylcarbonates (DAC) and the lows percentage can be measured. Diarylcarbonates are formed by the reaction of two end-capping agents with phosgene, creating a small molecule. In embodiments, the resulting photoactive additive contains less than 1000 parts per million (ppm) of diarylcarbonates. The lows percentage is the percentage by weight of oligomeric chains having a molecular weight of less than 1000. In embodiments, the lows percentage is 2.0 wt % or less, including from about 1.0 wt % to 2.0 wt %. The DAC level and the lows percentage can be measured by high performance liquid chromatography (HPLC) or gel permeation chromatography (GPC). Also of note is that the resulting photoactive additive does not contain any residual pyridine, because pyridine is not used in the manufacture of the photoactive additive.

Blends with Second Polymer Resin

The photoactive additive can be blended with a polymeric base resin that is different from the photoactive additive, i.e. a second polymer resin, to form the polymeric compositions/blends of the present disclosure. More specifically, the second polymer resin does not contain photoactive groups. In embodiments, the weight ratio of the cross-linkable polycarbonate resin to the polymeric base resin is from 1:99 to 99:1. When the additive contains a monohydroxybenzophenone, the weight ratio of the cross-linkable polycarbonate resin to the polymeric base resin may be from about 50:50 to about 95:5. When the additive contains a dihydroxybenzophenone, the weight ratio of the cross-linkable polycarbonate resin to the polymeric base resin may be from about 10:90 to about 85:15, or from about 25:75 to about 50:50. The polymeric base resin has, in specific embodiments, a weight-average molecular weight of about 21,000 or greater, including from about 21,000 to about 40,000.

The cross-linkable polycarbonate resins are suitable for blending with polycarbonate homopolymers, polycarbonate copolymers, and polycarbonate blends. They are also suitable for blending with polyesters, polyarylates, polyestercarbonates, and polyetherimides.

The blends may comprise one or more distinct cross-linkable polycarbonates, as described herein, and/or one or more cross-linked polycarbonate(s). The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

The second polymer (Polymer B) may be any polymer different from the first polymer that is suitable for use in a blend composition. In certain embodiments, the second polymer may be a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the polymeric base resin may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the polymeric base resin may be a homopolycarbonate, a copolycarbonate, a polycarbonate-polysiloxane copolymer, a polyester-polycarbonate, or any combination thereof. In certain embodiments, the polymeric base resin is a p-cumyl phenol capped poly(isophthalate-terephthalate-resorcinol ester)-co-(bisphenol-A carbonate) copolymer. In certain embodiments, the polymeric base resin is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the polymeric base resin is a p-cumylphenol capped poly(19 mole % isophthalate-terephthalate-resorcinol ester)-co-(75 mole % bisphenol-A carbonate)-co-(6 mole % resorcinol carbonate) copolymer (Mw=29,000 Daltons). In another preferred embodiment, the polymeric base resin is a p-cumylphenol capped poly(10 wt % isophthalate-terephthalate-resorcinol ester)-co-(87 wt % bisphenol-A carbonate)-co-(3 mole % resorcinol carbonate) copolymer (Mw=29,000 Daltons).

In another preferred embodiment, the polymeric base resin is a polycarbonate polysiloxane copolymer. The polycarbonate-polysiloxane copolymer may be a siloxane block co-polycarbonate comprising from about 4 wt % siloxane (±10%) to about 25 wt % siloxane (±10%) and having a siloxane chain length of 10 to 200. In another preferred embodiment, the polymeric base resin is a PC-siloxane copolymer with 20% siloxane segments by weight.

In another preferred embodiment, the polymeric base resin is a p-cumylphenol capped poly(65 mole % BPA carbonate)-co-(35 mole % 3,3-bis(4-hydroxyphenyl)-2-phenylisoindolin-1-one (PPPBP) carbonate) copolymer (Mw=25,000 Daltons).

In another preferred embodiment, the polymeric base resin is a polyphosphonate polymer, a polyphosphonate copolymer, or a poly(polyphosphonate)-co-(BPA carbonate) copolymer.

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

In particular embodiments, the polymer resin in the blend is a polycarbonate-polysiloxane (PC—Si) copolymer. The polycarbonate units of the copolymer are derived from dihydroxy compounds having the structures of any of the formulas described above, but particularly those of the chain extenders of Formulas (A) and (B). Some illustrative examples of suitable dihydroxy compounds include the following: 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC—Si copolymer.

The polymer resin (polymer B) in the blend can be a polycarbonate resin having an aliphatic chain containing at least two carbon atoms as a repeating unit in the polymer backbone. This resin can also be considered a "soft segment polycarbonate" (SSP) resin. Generally speaking, the SSP resin is a copolymer of an aromatic difunctional compound and an aliphatic difunctional compound. The aromatic difunctional compound may have the structure of, for example, any of Formulas (B)-(J), previously described as chain extenders above. In specific embodiments, the aromatic difunctional compound is a bisphenol of Formula (B). The aliphatic difunctional compound provides a long aliphatic chain in the backbone and may have the structure of Formula (E). Exemplary aliphatic diols that are useful in SSP resins include adipic acid (n=4), sebacic acid (n=8), and dodecanedioic acid (n=10). The SSP resin can be formed, for example by the phosgenation of bisphenol-A, sebacic acid, and p-cumyl phenol. The SSP resin contains carbonate linkages and ester linkages.

In this regard, it is believed that the cross-linking reaction rate of the cross-linkable polycarbonate resin and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP resin with its aliphatic blocks, the hydrogen-to-ketone ratio is relatively high. As a result, the cross-linking density and the resulting flame retardance and chemical resistance should be very good for this blend. In addition, the SSP resin has very good flow properties. It is believed that the blend should also have good flow, and should also retain its ductile properties even after crosslinking.

The polymer resin (polymer B) in the blend can be a bisphenol-A homopolycarbonate. Such resins are available, for example as LEXAN from SABIC Innovative Plastics.

The polymer resin (polymer B) in the blend can be a polystyrene polymer. Such polymers contain only polystyrene monomers. Thus, for example ABS and MBS should not be considered polystyrene polymers.

The polymer resin (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer resin (polymer B) in the blend can be a dimethyl bisphenol cyclohexane-co-bisphenol-A copolymer, i.e. a DMBPC-BPA copolymer. The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other Additives

Other conventional additives can also be added to the polymeric composition (e.g. an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer).

In preferred embodiments, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

Various types of flame retardants can be utilized as additives. This includes flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like. Rimar salt and KSS and NATS, alone or in combination with other flame retardants, are particularly useful in the compositions disclosed herein. In certain embodiments, the flame retardant does not contain bromine or chlorine, i.e. is non-halogenated. Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations thereof. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. Exemplary MRAs include phthalic acid esters; di- or polyfunctional aromatic phosphates such as resorcinol tetraphenyl diphosphate (RDP), the bis(diphenyl) phosphate of hydroquinone and the bis(diphenyl) phosphate of bisphenol-A; pentaerythritol tetrastearate (PETS), and the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

In particular embodiments, the polymeric blend/composition includes the cross-linkable polycarbonate resin, an optional polymeric base resin, and a flame retardant which is Rimar salt and which is present in an amount of about 0.05 wt % to about 0.085 wt %, based on the total weight of the composition; and a plaque comprising the polymeric composition has a transparency of 70 to 90% at a thickness of 3.2 mm, measured according to ASTM D1003-13.

In other particular embodiments, the polymeric blend/composition includes the cross-linkable polycarbonate resin, an optional polymeric base resin, a flame retardant; a heat stabilizer, and a mold release agent.

The additives, when used, can improve various properties of the final article. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; ForPro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Formation of Articles and Films

The compositions/blends can be molded into useful shaped articles by a variety of means such as injection molding, overmolding, co-injection molding, extrusion, multilayer extrusion, rotational molding, blow molding and thermoforming to form articles. This includes thin-walled articles, including highly transparent thin-walled articles. The formed articles may be subsequently subjected to cross-linking conditions (e.g., UV-radiation) to affect cross-linking of the polycarbonates. Exemplary articles include a film, a sheet, a layer of a multilayer film, or a layer of a multilayer sheet.

In particular, there is a need for plastic films with good mechanical properties, surface finish, transparency, film processability, ink receptivity and scratch resistance for graphic applications. The printed film could be used as-is or further undergo additional processing step such as for in-mold decorating applications. In-mold decoration or insert mold decoration is a popular process of decorating a three-dimensional article. The process involves inserting a decorated and formed film into the molding tool during the injection molding cycle. This decorated and formed film is then bonded with or encapsulated by the molten plastic after the injection cycle. The decoration for the finished part can either be exposed to the environment as "first surface decoration" and/or encapsulated between the substrate and the injected material as "second surface decoration". The three-dimensional decorated article is prepared by creating a printed film. Screen-printing is an example of a suitable technique for producing graphics on film substrates. The film is then thermoformed on a tool that correspond to the three-dimensional shape desired of the final article. The applications are for graphic displays, electronic components, cell phones, automotive displays, etc. Polycarbonate film made from commercial LEXAN™ resin is able to meet these application requirements, but is relatively easy to scratch.

Figure 6:
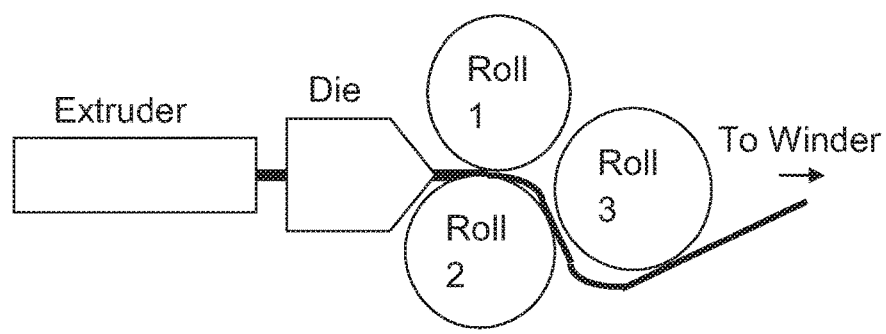
FIG. 6 illustrates the formation of a photoactive cross-linkable polycarbonate resin from 4-hydroxybenzophenone (benzophenone), bisphenol-A (dihydroxy chain extender), sebacic acid (aliphatic dicarboxylic acid), phosgene (a carbonate precursor), and t-butylphenol (end-capping agent).

A crosslinkable film can be made containing the photoactive additive (i.e. cross-linkable polycarbonate resin). The film is made via a continuous calendaring extrusion process. When selecting a polymeric base resin to combine with the photoactive additive, it is advantageous that the resin's viscosity and melt strength be sufficiently such that when extruded from the die a uniform and stable molten web can be formed. The extrusion calendaring process consists of a melt delivery system via an extruder or a set of extruders for co-extruded film. The extruder supplies the molten resin that is fed into a die which form a molten polymeric web that in turn feed a set of calendaring rolls. A schematic of this process is shown in FIG. 6.

A calendar typically consists of 2 to 4 counter rotating cylindrical rolls. These rolls are typically made from steel or rubber-covered steel, they are internally heated or cooled. The molten web formed by the die is successively squeezed between these rolls. The inter-roll clearances or "nips" through which the polymers are drawn through determine the thicknesses of the films. In a separate process or using an on-line UV curing unit the crosslinkable film layer can be further irradiated to produce the desired performance.

Figure 7:
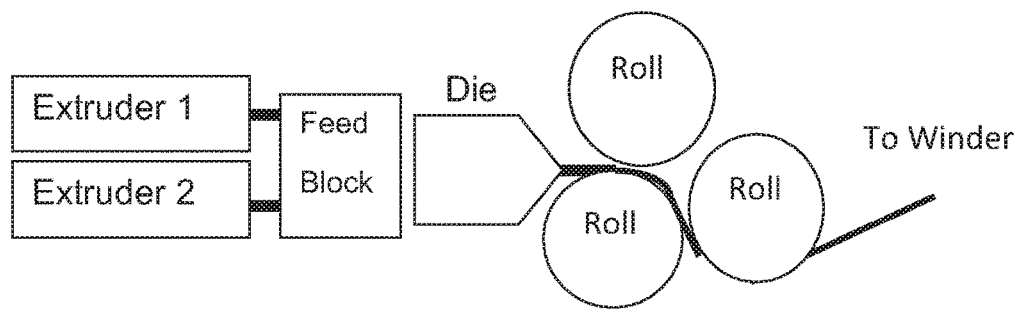
FIG. 7 illustrates the formation of a photoactive cross-linkable polycarbonate resin from 4,4'-dihydroxybenzophenone (benzophenone), bisphenol-AP (dihydroxy chain extender), phosgene (a carbonate precursor), and t-butylphenol (end-capping agent).

FIG. 7 depicts an alternate process. A co-extruded multi-layer film can be made via calendaring process with a set of extruders each supplying the molten resin for the individual layers. These melt streams are then fed into a feed block and then a die that in turn feed a set of calendaring rolls. A multi-manifold die can be used to obtain more uniform composite layers, with each layer being bonded to each other. For example, one layer (aka a cap layer) can be the film layer with the photoactive additive, and a second layer is a substrate layer. The cap layer can be from 2% to 40% of the total thickness of the film. The cap layer may be from 2.5 micrometers to 12.7 millimeters (0.00001 inch to about 0.5 inches) in thickness.

In particular embodiments, the multi-layer film includes a film layer and a substrate layer. The film layer includes the cross-linkable polycarbonate resin. Sometimes, the substrate layer can include additives to achieve an aesthetically pleasing appearance for the multi-layer film. Such additives can include colorants, pigments, fillers, metal flakes, or crushed glass.

Generally, the film layer/cap layer is described above with reference to a film. However, it is contemplated that the film layer/cap layer can also be made as a sheet, or can be placed on a sheet or a thin walled article. In this regard, the film layer containing the photoactive additive can have a thickness of 2.5 micrometers to 1 millimeter, or a thickness of 2.5 micrometers to 3 millimeters, or a thickness of 1 millimeter to about 5 millimeters.

UV Irradiation

After forming the article, the article can then be exposed to ultraviolet (UV) light at an appropriate wavelength and dosage to bring about the desired amount of crosslinking for the given application. The UV exposure can be performed on one or more surfaces of the article. It should be noted that with respect to the in-mold decorating described above, the film can be exposed to UV light after thermoforming and prior to being inserted into the molding tool, or the film can be exposed to UV light after having been inserted into the molding tool and after the molten plastic has been injected into the molding tool.

The article should be exposed with a substantially uniform dose of UV light. The exposure can be accomplished using standard methods. The UV light can come from any source of UV light such as mercury vapor, High-Intensity Discharge (HID), or various UV lamps. In some other embodiments, the article is exposed by using natural sunlight. The exposure time can range from a few minutes to several days. Examples of UV-emitting light bulbs include mercury bulbs (H bulbs), or metal halide doped mercury bulbs (D bulbs, H+ bulbs, and V bulbs). Other combinations of metal halides to create a UV light source are also contemplated. A mercury arc lamp is not used for irradiation. An H bulb has strong output in the range of 200 nm to 320 nm. The D bulb has strong output in the 320 nm to 400 nm range. The V bulb has strong output in the 400 nm to 420 nm range. It may also be advantageous to use a UV light source where the harmful wavelengths are removed or not present, using filters.

It can be beneficial to control the temperature. Often increased temperature can increase the crosslinking, but if the temperature is excessive the article can become unacceptably discolored, warped, or distorted.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

In particular embodiments, the article is exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

In some embodiments, the UV radiation is filtered to provide an effective dosage of at least 2 $J/cm^2$ of UVA radiation and no detectable UVC radiation, as measured using an EIT PowerPuck. In other more specific embodiments, the UV radiation is filtered to provide an effective dosage of at least 3 $J/cm^2$ of UVA radiation and no detectable UVC radiation, or at least 12 $J/cm^2$ of UVA radiation and no detectable UVC radiation, or at least 21 $J/cm^2$ of UVA radiation and no detectable UVC radiation, or at least 36 $J/cm^2$ of UVA radiation and no detectable UVC radiation, as measured using an EIT PowerPuck.

In certain embodiments, each side of the article is exposed to a dosage of about 21 $J/cm^2$ to about 60 $J/cm^2$ of UVA radiation, or in more particular embodiments a dosage of about 21 $J/cm^2$ to about 36 $J/cm^2$ of UVA radiation.

As previously mentioned, the substantially cross-linked articles of the present disclosure are generally very thin. Light energy is absorbed by the photoactive ketone group, resulting in decreased light intensity further into the depth of the article. The light intensity will follow the Beer-Lambert law and decrease logarithmically. When the article is sufficiently thin, or the UV exposure is for a sufficient length of time, enough energy can be irradiated throughout the article to create a substantially cross-linked network at every voxel within the article. As a result, there should be no material available for dripping in flame retardance tests. In addition, the substantially cross-linked article could only swell even in a miscible solvent, providing better chemical resistance.

The surface(s) of the substantially cross-linked article may have a water contact angle of 80° or less, or a water contact angle from about 70° to 80°, or a water contact angle from greater than 70° to less than 80°.

In particular embodiments contemplated herein, the substantially cross-linked article is a thin article in the form of a film, a fiber, a foam, or a powder. These substantially cross-linked articles have a maximum thickness of 0.6 mm, and in particular embodiments may have a thickness of about 100 μm to about 300 μm. No voids or pockets are present in the film.

A "fiber" is a strand of material having a length and a diameter, generally having a cylinder-like shape. The length is greater than the diameter. The fibers of the present disclosure may have an average length of from about 1 mm to about 5 mm, including from about 2 mm to about 4 mm. The fibers will have a maximum diameter of 0.6 mm (i.e. the thickness). In more particular embodiments, the diameter may be from about 10 microns to about 40 microns, including from about 12 microns to about 15 microns, or from about 50 nanometers (nm) to about 1000 nm.

The term "foam" refers to a solid that contains pockets therein. One property of a foam is its open/closed cell content. A closed cell is a discrete pocket which is completely surrounded by the solid. An open cell is a pocket that has at least one opening which eventually connects to the outer surface of the solid. Cells can be formed by blowing a gas through the polymeric composition as it solidifies, or by solid state foaming, or by including a foaming agent in the polymeric composition that forms a gas through chemical reaction. A foam may have the shape of a sheet, with two surfaces and a thickness between the surfaces. The surfaces may be continuous or discontinuous. The foam may comprise an interior resin of a secondary article or be shaped after formation.

A "powder" refers to a bulk solid of particles which can flow freely when shaken. The particles may be irregular in shape, but can be considered as having an area-based diameter equal to a sphere that has the same surface area. The powder will have a maximum particle diameter of 0.6 mm (i.e. the thickness).

The article may also be a molded article that has at least one wall with a thickness of 0.6 mm or less. An example of such an article is a cell phone cover.

In particular embodiments, the article is exposed to UV radiation on all surfaces or sides to maximize the penetration of the UV energy into the depth of the article. For example, a film would be exposed on both surfaces. This generally permits the dosage on each side to be lower than would be required, for example to expose a film on only one surface.

It is noted that fibers and powders could first be formed into the appropriate shape, and then exposed to UV radiation. Alternatively, fibers and powders could be formed by exposing a film to UV radiation, then post-processing the film (e.g. by cutting or grinding) to obtain the desired fibers/powders. It is contemplated that these fibers and powders might be useful as fillers.

An organogel can also be formed from the cross-linkable polycarbonate resins of the present disclosure. An organogel is a gel composed of a liquid organic phase within a three-dimensional, cross-linked network. The cross-linked network can be considered the continuous phase, and the liquid the discontinuous phase. A gel exhibits no flow in the steady state. The organogel can be produced by dissolving the cross-linkable polycarbonate resin into an organic solvent to form a solution. Other polymeric base resins can also be dissolved into the solution if desired. The cross-linkable polycarbonate resin can be in the form of fibers, powders, etc. The solution is then exposed to UV radiation to cause full cross-linking and form the organogel. In particular embodiments, the organogel is exposed to UV radiation for a period of at least 360 seconds (i.e. at least six minutes). The resulting organogel can be separated from any residual solvent in the solution. The mass ratio of polymer to solvent in the organogel may be from 10% to 50% prior to UV exposure.

The organogel thus formed can be dried to remove any solvent and obtain only the solid three-dimensional network. This structure can be considered a foam.

After UV exposure, the crosslinked layer will have high scratch resistance, particular for a film. Scratch resistance can be measured via the pencil hardness test of ASTM D3363-05. In the pencil hardness test of ASTM D3363-05, a load of 0.5 kgf is applied to a test sample at room temperature using a set of pencils having known hardnesses. A scratch rating is given based on the visibility of a scratch on a set of 5 specimens. The scratch ratings are 6B (softest), 5B, 4B, 3B, 2B, B, HB, F, H, 2H, 3H, 4H, 5H, and 6H (hardest). The resulting product of the present disclosure will have a scratch rating of HB or harder. This compares favorably to common polycarbonate films, which have scratch ratings of 3B-B.

The following examples are provided to illustrate the polymeric compositions/blends, products, processes and properties of the present disclosure. The examples are merely illustrative and are not intended to limit the disclosure to the materials, conditions, or process parameters set forth therein.

EXAMPLES

All solvents and reagents used were analytical grade.

Molecular weight determinations were performed using gel permeation chromatography (GPC). Gel permeation chromatography using polycarbonate standards were run on the eluted fraction.

The Yellowness Index (YI) was measured before and/or after UV exposure using an X-Rite Color i7 benchtop spectrophotometer in the transmission mode using CIELAB color equation, an observer angle of 2 degrees, and illuminant C as the light source. YI was measured following ASTM E313-73 (D1925).

Table 1 is a list of the ingredients used in the various examples.

TABLE 1

| Component | Description | Trade name |
| --- | --- | --- |
| DHBP-10 | Polycarbonate containing 10 mole % 4,4'-DHBP, remainder bisphenol-A with Mw~22,000 g/mol | |
| DHBP-20 | Polycarbonate containing 20 mole % 4,4'-DHBP, remainder bisphenol-A with Mw~22,000 g/mol | |
| HBP-PC | Bisphenol-A polycarbonate containing 4 mole % 4-HBP endcaps, Mw~21,000 g/mol | |
| LF-PC | Bisphenol-A homopolymer with Mw~30,000 g/mol, MFR = 7 g/10 min | |
| Phosphite | Tris (2,4-di-tert-butylphenyl) phosphite | Irgaphos 168 |
| Rimar Salt | Potassium perfluorobutanesulfonate | Lanxess |
| Siloxane | octaphenylcyclotetrasiloxane | |

Preparation of Substantially Cross-Linked Polycarbonate Films

Films were produced from compositions as described below in Tables A and C. Samples A, B, and C were made by film extrusion. Samples D, E, F, and G were solvent cast from methylene chloride at 10% by mass polymer, with no additives.

Portions of the films were cut into 100 mm squares. Some of Samples A, B, and C were then exposed to 0, 6, 21, or 36 J/cm² of ultraviolet light on both surfaces. Samples were exposed to filtered UV light provided by a Loctite Zeta 7411-S system, which used a 400 W metal halide arc lamp and behaved like a D-bulb electrodeless bulb in spectral output with a 280-nm cut-on wavelength filter. This was done because in prior experiments, filtered light showed a lower change in YI for equivalent doses of UVA compared to unfiltered UV light. Samples A-G were also exposed to 36 or 60 J/cm² of ultraviolet light on only one surface. After exposure to ultraviolet light, the samples were sectioned into strips having a mass between 0.1 grams and 0.2 grams. These strips were subjected to a swelling cycle. The mass of each sample was recorded prior to immersion in methylene chloride. The samples were immersed in methylene chloride for 24 hours. The insoluble fraction was separated from the solution by decanting, and the residual material was dried in a vacuum oven for 24 hours. The mass of the residual polymer was recorded, and the insoluble fraction was determined. The change in YI (dYI) for the UV doses were all determined relative to 0 J/cm² exposure.

The samples were analyzed after the swelling cycle to determine if the film remained in a single continuous piece at the end of the cycle. Samples which were intact after the swelling cycle also remained intact after a 200° C., 30 minute heating cycle.

TABLE A

| Component (wt %) | Ex. A1 | Ex. B1 | Ex. B2 | Ex. B3 | Ex. C1 | Ex. C2 | Ex. C3 | Ex. C4 |
| --- | --- | --- | --- | --- | --- | --- | --- | --- |
| DHBP-10 | | 99.76 | 99.76 | 99.76 | 24.94 | 24.94 | 24.94 | 24.94 |
| HBP-PC | 99.94 | | | | | | | |
| LF-PC | | | | | 74.82 | 74.82 | 74.82 | 74.82 |
| Phosphite | 0.06 | 0.06 | 0.06 | 0.06 | 0.06 | 0.06 | 0.06 | 0.06 |
| Rimar Salt | | 0.08 | 0.08 | 0.08 | 0.08 | 0.08 | 0.08 | 0.08 |

TABLE A-continued

| Component (wt %) | Ex. A1 | Ex. B1 | Ex. B2 | Ex. B3 | Ex. C1 | Ex. C2 | Ex. C3 | Ex. C4 |
|---|---|---|---|---|---|---|---|---|
| Siloxane | | 0.1 | 0.1 | 0.1 | 0.1 | 0.1 | 0.1 | 0.1 |
| Film Thickness (mil) | 7.2 | 2 | 4 | 10 | 2 | 4 | 10 | 20 |

TABLE B

| | Ex. A1 | Ex. B1 | Ex. B2 | Ex. B3 | Ex. C1 | Ex. C2 | Ex. C3 | Ex. C4 |
|---|---|---|---|---|---|---|---|---|
| 0 J/cm$^2$ UVA, Both Sides | | | | | | | | |
| Mw (g/mol) | 28569 | 23600 | 23203 | 24082 | 25411 | 25113 | 25325 | 25317 |
| Mn (g/mol) | 8369 | 11022 | 10655 | 10859 | 11341 | 11300 | 11340 | 11289 |
| YI | 0.8 | 0.5 | 0.7 | 1.2 | 0.7 | 0.7 | 0.9 | 1.2 |
| Insoluble Fraction | 0% | 0% | 0% | 0% | 0% | 0% | 0% | 0% |
| 6 J/cm$^2$ UVA, Both Sides | | | | | | | | |
| Mw (g/mol) | 49211 | 21666 | 34134 | 45210 | 59583 | 65958 | 57114 | 42081 |
| Mn (g/mol) | 9917 | 7095 | 9162 | 11833 | 11664 | 12773 | 13176 | 12457 |
| dYI | 0.8 | 0.9 | 1.2 | 1.9 | 0.6 | 1.0 | 1.3 | 1.7 |
| Insoluble Fraction | <1% | 65% | 16% | 14% | 7% | 5% | 4% | 1% |
| Intact after Swelling? | N | N | N | N | N | N | N | N |
| 21 J/cm$^2$ UVA, Both Sides | | | | | | | | |
| Mw (g/mol) | 73494 | 5891 | 5159 | 30381 | 11297 | 11165 | 37745 | 57295 |
| Mn (g/mol) | 10056 | 2805 | 2815 | 10413 | 4907 | 5019 | 9410 | 12142 |
| dYI | 2.4 | 4.0 | 6.4 | 6.5 | 1.5 | 2.9 | 4.4 | 5.2 |
| Insoluble Fraction | 21% | 87% | 84% | 43% | 67% | 67% | 61% | 18% |
| Intact after Swelling? | N | Y | Y | N | N | N | N | N |
| 36 J/cm$^2$ UVA, Both Sides | | | | | | | | |
| Mw (g/mol) | 17137 | 4800 | 6200 | 23103 | 11436 | 11884 | 24369 | 54243 |
| Mn (g/mol) | 3562 | 2373 | 2647 | 7834 | 4525 | 4960 | 7394 | 10740 |
| dYI | 5.2 | 4.3 | 7.8 | 15.1 | 2.7 | 4.5 | 7.0 | 8.9 |
| Insoluble Fraction | 96% | 91% | 95% | 54% | 83% | 76% | 71% | 38% |
| Intact after Swelling? | Y | Y | Y | N | Y | Y | Y | N |

TABLE C

| Component (wt %) | Ex. A2 | Ex. A3 | Ex. B4 | Ex. C5 | Ex. D1 | Ex. E1 | Ex. F1 | Ex. G1 |
|---|---|---|---|---|---|---|---|---|
| DHBP-10 | | | 99.76 | 24.94 | 100 | | 25 | |
| DHBP-20 | | | | | | 100 | | 25 |
| HBP-PC | 99.94 | 99.94 | | | | | | |
| LF-PC | | | | 74.82 | | | 75 | 75 |
| Phosphite | 0.06 | 0.06 | 0.06 | 0.06 | | | | |
| Rimar Salt | | | 0.08 | 0.08 | | | | |
| Siloxane | | | 0.1 | 0.1 | | | | |
| Film Thickness (μm) | 183 | 182 | 50 | 50 | 13 | 16 | 13 | 12 |

TABLE D

| UVA Dose | Ex. A2 | Ex. A3 | Ex. B4 | Ex. C5 | Ex. D1 | Ex. E1 | Ex. F1 | Ex. G1 |
|---|---|---|---|---|---|---|---|---|
| Side 1 (J/cm$^2$) | 36 | 60 | 36 | 36 | 36 | 36 | 36 | 36 |
| Side 2 (J/cm$^2$) | 0 | 0 | 0 | 0 | 0 | 0 | 0 | 0 |
| Film Thickness (μm) | 183 | 182 | 50 | 50 | 13 | 16 | 13 | 12 |
| Mw (g/mol) | 67126 | 60258 | 15589 | 21709 | 3168 | 4305 | 14573 | 17479 |
| Mn (g/mol) | 10579 | 8420 | 4847 | 6654 | 783 | 2169 | 5232 | 4706 |
| Insoluble Fraction | 10% | 66% | 61% | 63% | 89% | 92% | 53% | 68% |
| Intact after Swelling? | N | N | N | N | Y | Y | N | N |

Generally, an insoluble fraction greater than 80% or 90% would indicate a strong pass for neat resins. The reduced ketone loading samples (A and C) allowed for thicker films to be fully crosslinked than systems with 10 mole % ketone (B). However, Sample C required higher doses to reach the fully crosslinked state. Generally, the ketone level, dose and thickness can be tuned to optimize throughput and the extent of crosslinking in the articles.

Next, from 10 mil film rolls of Samples B and C, parts were made according to standard ASTM sizes using a punch-out cutter. Tensile test parts could be produced in machine direction (MD) orientation and transverse direction (TD) orientation with respect to the direction of the calendaring extrusion process. A commercially available bisphenol-A homopolymer film (Lexan 8010) was used as a control (Con). The results are shown in Tables E, F, and G.

TABLE E

|  | Ex. B5 | Ex. B6 | Ex. B7 | Ex. B8 | Ex. B9 |
|---|---|---|---|---|---|
| UVA Dose, Side 1 (J/cm$^2$) | 0 | 6 | 21 | 6 | 21 |
| UVA Dose, Side 2 (J/cm$^2$) | 0 | 0 | 0 | 6 | 21 |
| Tensile Modulus (MPa), MD | 2340 | 2246 | 2382 | 2284 | 2346 |
| Tensile Strength at Break (MPa), MD | 71 | 64 | 67 | 65 | 63 |
| Tensile Elongation at Break (%), MD | 109 | 117 | 97 | 110 | 93 |
| Tensile Modulus (MPa), TD | 2204 | 2212 | 2230 | 2232 | 2278 |
| Tensile Strength at Break (MPa), TD | 59 | 62 | 56 | 59 | 47 |
| Tensile Elongation at Break (%), TD | 122 | 127 | 106 | 113 | 75 |

TABLE F

|  | Ex. C6 | Ex. C7 | Ex. C8 | Ex. C9 | Ex. C10 |
|---|---|---|---|---|---|
| UVA Dose, Side 1 (J/cm$^2$) | 0 | 6 | 21 | 6 | 21 |
| UVA Dose, Side 2 (J/cm$^2$) | 0 | 0 | 0 | 6 | 21 |
| Tensile Modulus (MPa), MD | 2298 | 2320 | 2328 | 2280 | 2360 |
| Tensile Strength at Break (MPa), MD | 61 | 61 | 60 | 59 | 52 |
| Tensile Elongation at Break (%), MD | 107 | 100 | 93 | 99 | 63 |
| Tensile Modulus (MPa), TD | 2254 | 2238 | 2266 | 2266 | 2268 |
| Tensile Strength at Break (MPa), TD | 57 | 58 | 56 | 53 | 52 |
| Tensile Elongation at Break (%), TD | 107 | 109 | 95 | 83 | 76 |

TABLE G

|  | Con1 | Con2 | Con3 | Con4 | Con5 |
|---|---|---|---|---|---|
| UVA Dose, Side 1 (J/cm$^2$) | 0 | 6 | 21 | 6 | 21 |
| UVA Dose, Side 2 (J/cm$^2$) | 0 | 0 | 0 | 6 | 21 |
| Tensile Modulus (MPa), MD | 2358 | 2298 | 2350 | 2282 | 2210 |
| Tensile Strength at Break (MPa), MD | 70 | 63 | 69 | 64 | 65 |
| Tensile Elongation at Break (%), MD | 129 | 113 | 121 | 120 | 121 |
| Tensile Modulus (MPa), TD | 2404 | 2276 | 2230 | 2280 | 2208 |
| Tensile Strength at Break (MPa), TD | 67 | 57 | 57 | 55 | 57 |
| Tensile Elongation at Break (%), TD | 128 | 115 | 111 | 106 | 114 |

Films made from the crosslinkable polycarbonates maintained tensile modulus after UV exposure in both directions. Tensile elongation at break was reduced after UV exposure, but still retained a significant percentage of the initial elongation prior to UV exposure.

Table H shows the results of Taber abrasion tests (ASTM D1044-05) conducted at 5 cycles, 10 cycles, 20 cycles and 50 cycles on 10 mil films. Film test parts were prepared by punching out test discs made from Samples B and C that were then abraded on a Taber 5130 Abrader with a Calibrase CS-10F abrasive wheel. Delta Haze reported in the table are differences observed in haze values before and after test parts were subjected to the abrasive wheel. Films made from crosslinkable polycarbonates showed improved resistance to abrasion after UV exposure of approximately 3 Delta Haze, and had improved performance compared to UV exposed Lexan® 8010, which was again used as a control (Con).

TABLE H

|  | Con6 | Con7 | Ex. B10 | Ex. B11 | Ex. C11 | Ex. C12 |
|---|---|---|---|---|---|---|
| UVA Dose, Side 1 (J/cm$^2$) | 0 | 6 | 0 | 6 | 0 | 6 |
| Taber Abrasion (delta haze)/5 cycles | 10.5 | 13.1 | 12.5 | 9.6 | 11.3 | 8.9 |
| Taber Abrasion (delta haze)/10 cycles | 15.4 | 16.4 | 16.5 | 13.7 | 16.3 | 14.6 |
| Taber Abrasion (delta haze)/20 cycles | 19.8 | 21.1 | 20.6 | 17.7 | 21.4 | 18.3 |
| Taber Abrasion (delta haze)/50 cycles | 21.7 | 21.2 | 23.3 | 19.4 | 23.9 | 21.3 |

20 mil film samples were also tested for scratch resistance via pencil hardness test (ASTM D3363-05 method) with 500 gram load. The result in Table I shows hardness improvement after UV exposure and when compared to the control (Con) samples of commercially available Lexan® 8010 film.

TABLE I

|  | Con8 | Con9 | Con10 | Ex. B12 | Ex. B13 | Ex. B14 | Ex. C13 | Ex. C14 | Ex. C15 |
|---|---|---|---|---|---|---|---|---|---|
| UVA Dose, Side 1 (J/cm$^2$) | 0 | 6 | 21 | 0 | 6 | 21 | 0 | 6 | 21 |
| Pencil Hardness (0.5 kgf) | HB | HB | HB | HB | F | F | HB | HB | F |

Preparation of a Substantially Cross-Linked Organogel

In Example 1, a solution of methylene chloride (10 mL, 13.3 grams) was prepared in a scintillation vial, and 0.6776 grams of DHBP-20 and 0.6782 grams of LF-PC was added and the vial was shaken until the solution was fully dissolved.

The solution was then exposed to an ultraviolet light emitting diode light source with peak wavelength of 365 nm (CS2010, Thor Labs). The output of the light source was placed directly against the side of the jar and irradiated for specific times and the presence or absence of a gel was recorded.

In Example 2, a solution of methylene chloride (10 mL, 13.3 grams) was prepared in a scintillation vial, and 1.3565 grams of HBP-PC was added and the vial was shaken until the solution was fully dissolved.

The solution was then exposed to an ultraviolet light emitting diode light source with a peak wavelength of 365 nm (CS2010, Thor Labs). The output of the light source was placed directly against the side of the jar and irradiated for specific times and the presence or absence of a gel was recorded. The results are shown in Table J.

TABLE J

|  | Exposure Time (seconds) | Gel Present |
|---|---|---|
| Example 1 | 0 | N |
|  | 60 | N |
|  | 360 | Y |
|  | 720 | Y |
| Example 2 | 0 | N |
|  | 60 | N |
|  | 360 | Y |
|  | 720 | Y |

The gels formed in both Examples had a yellow color in the region closest to the light source, and expanded further into the solution with longer exposure time. The gels could be removed from the solution and dried. The gels could also be repeatedly swelled and de-swelled without issue.

Example 3

Plaques having a thickness of 1.5 mm were molded from a copolymer made with 10 mole % DHBP, remainder bisphenol-A, and 4.0 mole % 4-hydroxybenzophenone endcaps, and having an Mw of about 22,000 g/mol according to polycarbonate standards. Each plaque was considered to be flat and uniform, but contained built in stresses from molding.

The water contact angle was measured on plaques made using a Dataphysics Contact Angle System OCA with deionized water. Measurements were taken on plaques exposed to 0 J/cm$^2$, 6 J/cm$^2$, 21 J/cm$^2$, and 36 J/cm$^2$ of UVA energy. Water contact angles reported in Table K are an average of three sample measurements.

TABLE K

| Sample | Dose (J/cm$^2$ UVA) | Water Contact Angle (°) |
|---|---|---|
| Example 3A | 0 | 83 |
| Example 3B | 6 | 78 |
| Example 3C | 21 | 76 |
| Example 3D | 36 | 78 |
| Example 3E | 60 | 77 |

As seen from these results, the water contact angle decreased upon the initial exposure of UVA radiation and did not significantly increase with further irradiation. Since water contact angle is largely a surface phenomenon, this change in water contact angle does not require additional dose to infiltrate into the depths of the sample.

Set forth below are examples of the compositions, articles, and methods disclosed herein.

Embodiment 1

A substantially cross-linked article, wherein the article is formed by: forming a product from a polymeric composition comprising: a cross-linkable polycarbonate resin containing a photoactive group derived from a benzophenone; and exposing the formed product to an effective dosage of ultraviolet radiation to cause substantial cross-linking of the polycarbonate resin throughout the formed product, producing the substantially cross-linked article.

Embodiment 2

The article of Embodiment 1, wherein the article is a film, a fiber, a foam, a powder, or a molded article having at least one wall with a thickness of 0.6 mm or less.

Embodiment 3

The article of any one of Embodiments 1-2, wherein the benzophenone from which the photoactive group is derived is a monohydroxybenzophenone or a dihydroxybenzophenone.

Embodiment 4

The article of Embodiment 3, wherein the cross-linkable polycarbonate resin is formed from a reaction of: the monohydroxybenzophenone; a diol chain extender; and a first linker moiety comprising a plurality of linking groups, wherein each linking group can react with the hydroxyl groups of the monohydroxybenzophenone and the diol chain extender.

Embodiment 5

The article of any one of Embodiments 3-4, wherein the cross-linkable polycarbonate resin contains from about 0.5 mole % to about 5 mole % of endcap groups derived from the monohydroxybenzophenone.

Embodiment 6

The article of any one of Embodiments 1-5, wherein the substantially cross-linked article has an insoluble mass percentage of at least 90%.

Embodiment 7

The article of any one of Embodiments 1-6, wherein the article has a water contact angle of 80° or less.

Embodiment 8

A method for forming an organogel, comprising: dissolving a cross-linkable polycarbonate resin in a solvent to form a solution, wherein the cross-linkable polycarbonate resin contains a photoactive group derived from a benzophenone; and exposing the solution to an effective dosage of ultraviolet radiation to cause substantial cross-linking of the polycarbonate resin and form the organogel.

Embodiment 9

The method of Embodiment 8, wherein the mass ratio of polymer to solvent in the solution is from 10% to 50% prior to UV exposure.

Embodiment 10

A product having improved scratch resistance, comprising: a crosslinked layer formed from a cross-linkable polycarbonate resin containing a photoactive group derived from a dihydroxybenzophenone.

Embodiment 11

The product of Embodiment 10, wherein the product has a scratch rating of HB or harder according to ASTM D3363;

or wherein the product further comprises a substrate layer formed from a substrate resin and bonded to the crosslinked layer.

Embodiment 12

The product of any one of Embodiments 10-11, wherein the crosslinked layer is from about 2% to about 40% of the thickness of the product; or wherein the crosslinked layer has a thickness of about 2.5 micrometers to about 12.7 millimeters; or wherein the substrate resin is a polycarbonate film.

Embodiment 13

The product of any one of Embodiments 10-12 or the article of Embodiment 3, wherein the cross-linkable polycarbonate resin is formed from a reaction comprising: the dihydroxybenzophenone; a first diol chain extender; and a first linker moiety comprising a plurality of linking groups, wherein each linking group can react with the hydroxyl groups of the dihydroxybenzophenone and the first diol chain extender.

Embodiment 14

The product or the article of Embodiment 13, wherein the cross-linkable polycarbonate resin contains from about 0.5 mole % to about 50 mole % of repeating units derived from the dihydroxybenzophenone; or wherein the dihydroxybenzophenone is 4,4'-dihydroxybenzophenone, the diol chain extender is bisphenol-A, and the first linker moiety is phosgene; or wherein the cross-linkable polycarbonate resin contains from about 0.5 mole % to about 5 mole % of endcaps derived from an end-capping agent selected from the group consisting of phenol, p-t-butylphenol, p-cumylphenol, octylphenol, and p-cyanophenol; or wherein the cross-linkable polycarbonate resin contains a second diol chain extender, and the cross-linkable polycarbonate resin is a terpolymer.

Embodiment 15

The product of any one of Embodiments 10-14, wherein the crosslinked layer further comprises a polymeric base resin which is different from the cross-linkable polycarbonate resin; and optionally wherein the polymeric base resin contains repeating units derived from a polyarylate or a resorcinol phthalate.

Embodiment 16

The product of any one of Embodiments 10-15, wherein the product is a film, a sheet, or an article having a maximum thickness of 1 mm.

Embodiment 17

The article of any one of Embodiments 1-7 or the product of any one of Embodiments 10-16, wherein the product is exposed to from about 6 J/cm$^2$ to about 36 J/cm$^2$ of UVA radiation on one side or on opposite sides of the product.

Embodiment 18

The article of any one of Embodiments 1-7 or the product of any one of Embodiments 10-17, wherein the product is exposed to ultraviolet radiation having a wavelength between 280 nm and 380 nm.

Embodiment 19

An article comprising the product of any one of Embodiments 10-18.

Embodiment 20

The article of Embodiment 19, wherein the article is a graphic display, an electronic component, a cell phone, an automotive display, an external automotive part, an external agricultural equipment part, or an external construction equipment part.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A substantially cross-linked article, wherein the article is formed by:
    forming a product from a polymeric composition comprising:
        a cross-linkable polycarbonate resin containing a photoactive group derived from a benzophenone; and
    exposing the formed product to an effective dosage of ultraviolet radiation to cause substantial cross-linking of the polycarbonate resin throughout the formed product, producing the substantially cross-linked article,
    wherein the substantially cross-linked article has an insoluble mass percentage of at least 90%.

2. The article of claim 1, wherein the article is a film, a fiber, a foam, a powder, or a molded article having at least one wall with a thickness of 0.6 mm or less.

3. The article of claim 1, wherein the benzophenone from which the photoactive group is derived is a monohydroxybenzophenone or a dihydroxybenzophenone.

4. The article of claim 3, wherein the cross-linkable polycarbonate resin is formed from a reaction of:
    the monohydroxybenzophenone;
    a diol chain extender; and
    a first linker moiety comprising a plurality of linking groups, wherein each linking group can react with the hydroxyl groups of the monohydroxybenzophenone and diol chain extender.

5. The article of claim 3, wherein the cross-linkable polycarbonate resin contains from about 0.5 mole % to about 5 mole % of endcap groups derived from the monohydroxybenzophenone.

6. The article of claim 1, wherein the article has a water contact angle of 80° or less.

7. The article of claim 1, wherein the cross-linkable polycarbonate resin has a polydispersity index of 2.0 to 3.0.

8. The article of claim 1, wherein the article is a film, a fiber, or a foam.

* * * * *